(12) United States Patent
Zembutsu et al.

(10) Patent No.: US 11,306,774 B2
(45) Date of Patent: Apr. 19, 2022

(54) TAPERED ROLLER BEARING

(71) Applicant: NSK LTD., Tokyo (JP)

(72) Inventors: Makoto Zembutsu, Fujisawa (JP);
Hiroaki Yamanaka, Fujisawa (JP);
Tomoyuki Miyazaki, Fujisawa (JP);
Hiroki Maejima, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/979,041

(22) PCT Filed: Mar. 8, 2019

(86) PCT No.: PCT/JP2019/009490
§ 371 (c)(1),
(2) Date: Sep. 8, 2020

(87) PCT Pub. No.: WO2019/172446
PCT Pub. Date: Sep. 12, 2019

(65) Prior Publication Data
US 2021/0054877 A1     Feb. 25, 2021

(30) Foreign Application Priority Data

Mar. 9, 2018    (JP) .............................. JP2018-043540

(51) Int. Cl.
*F16C 19/26*       (2006.01)
*F16C 19/36*       (2006.01)
(Continued)

(52) U.S. Cl.
CPC ............ *F16C 19/364* (2013.01); *F16C 19/26* (2013.01); *F16C 33/1045* (2013.01);
(Continued)

(58) Field of Classification Search
CPC .... F16C 19/26; F16C 19/364; F16C 33/1045; F16C 33/56; F16C 33/366; F16C 33/467;
(Continued)

(56) References Cited

U.S. PATENT DOCUMENTS 1,011,029 A * 12/1911 Chambers ............. F16C 33/543
384/575
2,219,031 A * 10/1940 Frauenthal .......... F16C 33/4629
384/572
(Continued)

FOREIGN PATENT DOCUMENTS

CN         1607338 A      4/2005
CN       104747591 A      7/2015
(Continued)

OTHER PUBLICATIONS

Extended European Search Report dated Mar. 25, 2021, by the European Patent Office in counterpart European patent Application No. 19764186.3.
(Continued)

*Primary Examiner* — Marcus Charles
(74) *Attorney, Agent, or Firm* — Sughrue Mion, PLLC

(57) ABSTRACT

A holder of a tapered roller bearing is made of a resin, has a first gap between an axially inner end surface of a small-diameter-side annular part and small-diameter-side end surfaces of tapered rollers, has a second gap between an axially inner end surface of a large-diameter-side annular part and large-diameter-side end surfaces of the tapered rollers, and is provided to be capable of moving within a prescribed range along the axial direction. The surface of the axially inner end surface of the large-diameter-side annular part is rough, the large-diameter-side annular part is provided with one or more grooves which are oil-holding parts that hold the lubricating oil, and ends of the grooves are
(Continued)

positioned to be capable of coming into contact with the tapered rollers.

16 Claims, 31 Drawing Sheets

(51) Int. Cl.
  *F16C 33/10* (2006.01)
  *F16C 33/46* (2006.01)
  *F16C 33/66* (2006.01)
(52) U.S. Cl.
  CPC ...... *F16C 33/1065* (2013.01); *F16C 33/4635* (2013.01); *F16C 33/4682* (2013.01); *F16C 33/66* (2013.01); *F16C 2240/30* (2013.01)
(58) Field of Classification Search
  CPC ............... F16C 33/664; F16C 33/6651; F16C 33/4682; F16C 2240/30; F16C 33/1065; F16D 3/22
  USPC ............... 384/462, 470, 559–560, 571–572
  See application file for complete search history.

(56) References Cited

U.S. PATENT DOCUMENTS

| | | | | |
|---|---|---|---|---|
| 2,867,076 | A * | 1/1959 | Atwood | .................. D01H 7/62 57/120 |
| 4,400,040 | A * | 8/1983 | Toth | ..................... F16C 19/364 384/465 |
| 4,978,237 | A | 12/1990 | Motohashi et al. | |
| 6,135,643 | A * | 10/2000 | Hattori | ................. B60B 27/001 384/539 |
| 9,267,543 | B2 * | 2/2016 | Suzuki | ............... F16C 33/6651 |
| 9,689,423 | B2 * | 6/2017 | Suzuki | ................. F16C 19/364 |
| 2007/0047865 | A1 * | 3/2007 | Nakamizo | .......... F16C 33/4676 384/571 |
| 2009/0060407 | A1 * | 3/2009 | Tachi | ................. F16C 33/3875 384/533 |
| 2010/0002976 | A1 | 1/2010 | Matsuyama et al. | |
| 2010/0111459 | A1 * | 5/2010 | Yasuda | .................. F03D 80/70 384/548 |
| 2012/0263405 | A1 | 10/2012 | Mizuki et al. | |
| 2015/0176648 | A1 | 6/2015 | Okamoto et al. | |
| 2015/0176649 | A1 | 6/2015 | Okamoto et al. | |
| 2015/0176650 | A1 | 6/2015 | Suzuki et al. | |
| 2015/0252848 | A1 | 9/2015 | Suzuki | |
| 2015/0275974 | A1 | 10/2015 | Suzuki | |
| 2017/0204909 | A1 | 7/2017 | Murata et al. | |

FOREIGN PATENT DOCUMENTS

| | | | | |
|---|---|---|---|---|
| CN | 104912919 | A | 9/2015 | |
| CN | 106969037 | A | 7/2017 | |
| DE | 4016492 | A1 * | 11/1990 | ............ F16C 33/366 |
| DE | 10-2009-055660 | A1 | 5/2011 | |
| DE | 102015100403 | A1 * | 7/2015 | ............ F16C 33/585 |
| DE | 102016222711 | A1 * | 5/2018 | .......... F16C 33/4682 |
| EP | 0 342 611 | A2 | 11/1989 | |
| JP | S54-027256 | U | 7/1979 | |
| JP | 1-168014 | U | 11/1989 | |
| JP | H05-87326 | U | 11/1993 | |
| JP | H07-006524 | U | 1/1995 | |
| JP | H08-184318 | A | 7/1996 | |
| JP | H08-200376 | A | 8/1996 | |
| JP | H09-203414 | A | 8/1997 | |
| JP | 2000-130443 | A | 5/2000 | |
| JP | 2003-21146 | A | 1/2003 | |
| JP | 2003-294038 | A | 10/2003 | |
| JP | 2007-032612 | A | 2/2007 | |
| JP | 2008-069875 | A | 3/2008 | |
| JP | 2003287033 | A | 10/2010 | |
| JP | 2011-202714 | A | 10/2011 | |
| JP | 2012251571 | A * | 12/2012 | .......... F16C 33/4635 |
| JP | 5668420 | B2 | 2/2015 | |
| JP | 2007040512 | A | 2/2015 | |
| JP | 2015045402 | A * | 3/2015 | ............ F16C 19/364 |
| JP | 2015-183804 | A | 10/2015 | |
| JP | 2016-142382 | A | 8/2016 | |
| JP | 2017-166641 | A | 9/2017 | |
| WO | 2008087926 | A1 | 7/2008 | |

OTHER PUBLICATIONS

Communication dated Jul. 22, 2021, issued by the State Intellectual Property Office of the P.R.China in application No. 201980018295.6.

Written Opinion (PCT/ISA/237) issued by the International Searching Authority in corresponding International Application No. PCT/JP2019/009490, dated Jun. 11, 2019.

International Search Report (PCT/ISA/210), issued by International Searching Authority in corresponding International Application No. PCT/JP2019/009490, dated Jun. 11, 2019.

* cited by examiner

TAPERED ROLLER BEARING

CROSS REFERENCE TO RELATED APPLICATIONS

This application is a National Stage of International Application No. PCT/JP2019/009490 filed Mar. 8, 2019, claiming priority based on Japanese Patent Application No. 2018-043540 filed Mar. 9, 2018, the entire contents of which are hereby incorporated by reference.

TECHNICAL FIELD

The present invention relates to a tapered roller bearing, and particularly, to a tapered roller bearing in which lubricating oil is supplied inside the bearing.

BACKGROUND ART

In recent years, a system for stopping a lubricating oil pump during engine stop such as in a transmission of some hybrid vehicles has been introduced, which is likely to cause a problem of seizure of a bearing. When a vehicle is being towed, the lubricating oil pump does not operate and tires run idle, which may cause the seizure of the bearing in the transmission. Therefore, there is a need for preventing the seizure of the bearing even under a lubricated environment with an extremely small amount of lubricating oil.

A bearing from the related arts is known, which includes an outer ring and an inner ring, a plurality of balls arranged between the outer ring and the inner ring, and a synthetic resin holder rotatably holding the plurality of balls, in which an uneven surface with parallel thin, densely-arranged grooves is formed on an inner surface of a pocket of the synthetic resin holder (for example, see JP Hei-8-184318 A (PTL 1)). The synthetic resin holder is provided for a ball bearing and can be injection molded. A plurality of fine grooves are formed along a radial or circumferential direction of the pocket.

A similar synthetic resin holder is known, in which two oil grooves or one spiral oil groove is formed on a portion of the inner surface of the pocket (for example, see JP Sho-54-027256 U (PTL 2)). The heat generation due to sliding contact is prevented by forming such fine grooves or oil grooves which permeate the lubricating oil between the holder and the rolling elements.

A tapered roller bearing from the related arts is known, which is provided with a tapered roller contact member that is fixed to an outer circumferential surface of a large-diameter-side annular part of a holder at a predetermined distance from an inner circumferential surface of an outer ring, and that also contacts an end surface of a tapered roller (for example, see WO 2008/087926 (PTL 3)). The tapered roller contact member is made of a material having a property of allowing lubricating oil to permeate.

Another tapered roller bearing from the related arts is known, in which the inner circumferential surface of the large-diameter-side annular part of the holder is provided with the same number of holding recesses as the respective pockets at positions aligned with the respective pockets in the circumferential direction (for example, see JP 5668420 B (PTL 4)).

CITATION LIST

Patent Literature

PTL 1: JP Hei-8-184318 A
PTL 2: JP Sho-54-027256 U
PTL 3: WO 200/087926
PTL 4: JP 5668420 B

SUMMARY OF INVENTION

However, in the bearings described in PTLs 1 to 3, although the seizure of the bearing can be prevented, since an oil retaining part (the pocket surface with the fine groove or oil groove formed thereon, and the tapered roller contact member) is configured to be constantly in contact with the tapered roller (rolling element), it was difficult to maintain the lubricating effect for a long period of time due to the increase of frictional resistance and the acceleration of wear of the oil retaining part. In order to appropriately maintain the pressing force of the oil retaining part against the tapered rollers, a high degree of control is required for the dimensions, rigidity, and the like of the bearing member, which may increase the manufacturing cost.

In PTLs 1 and 2 described above, since the groove portion (fine groove or oil groove) penetrates the pocket surface in the radial direction and the closed portion at the end of the 2$ groove portion does not contact the tapered roller, the portion of the groove portion that has a high capillary force does not come into contact with the tapered roller, and accordingly, not all the lubricating oil stored in the groove portion can be supplied but some remains, resulting in insufficient effective lubrication of the tapered roller. For example, although PTL1 described above discusses in detail that various cross-sectional shapes of the groove can be applied, all the shapes have a greater capillary force at the groove depth part than at the pocket surface, making it difficult to supply the lubricating oil stored in the groove bottom to the tapered roller. In PTL 2 described above, there is no mention of the details of the cross-sectional shape of the groove.

In the bearing described in PTL 4, since the lubricating oil is stored in the holding concave portion which is large in size, the lubricating oil is supplied over a short period of time, and the effect of extending the seizure life is limited.

The present invention has been made in view of the problems described above, and an object thereof is to provide a tapered roller bearing capable of preventing seizure even under a lubricated environment with an extremely small amount of lubricating oil while suppressing an increase in frictional resistance and an increase in manufacturing cost.

The above object of the present invention is achieved by the following configurations.

(1) A tapered roller bearing including an outer ring including an outer ring raceway surface on an inner circumferential surface, an inner ring including an inner ring raceway surface on an outer circumferential surface, a plurality of tapered rollers rotatably provided between the outer ring raceway surface and the inner ring raceway surface, and a holder for holding the plurality of tapered rollers at substantially equal intervals in a circumferential direction, in which the holder includes a large-diameter-side annular part, a small-diameter-side annular part coaxially arranged with the large-diameter-side annular part, a plurality of column parts provided at substantially equal intervals in a circumferential direction and axially connecting the large-diameter-side annular part and the small-diameter-side annular part, and a pocket formed between the column parts adjacent to each other in the circumferential direction to hold the tapered roller to be capable of rolling. The holder is made of resin, includes a first gap between the axially inner end surface of the small-diameter-side annular part and the small-diameter-side end surface of the tapered roller, includes a second gap between the axially inner end surface of the large-diameter-side annular part and the large-diameter-side end surface of the tapered roller, and is movable within a predetermined range along the axial direction. Among surfaces of the large-diameter-side annular part, at least the axially inner end surface is rough. The large-diameter-side annular part is provided with an oil retaining part retaining a lubricating oil. When the holder is axially moved toward the small-diameter-side of the tapered roller, the oil retaining part comes into contact with the large-diameter-side end surface of the tapered roller, and when the holder is axially moved toward the large-diameter-side of the tapered roller, the oil retaining part is separated away from the large-diameter-side end surface of the tapered roller.

(2) The tapered roller bearing according to (1), in which the oil retaining part, capable of retaining lubricating oil, includes any one of one groove, a plurality of grooves, and a plurality of holes, an end of the groove or an end of the hole, which is contactable with the tapered roller, is arranged on the axially inner end surface of the large-diameter-side annular part, within a projection plane of the large-diameter-side end surface of the tapered roller onto the axially inner end surface of the large-diameter-side annular part. The groove or the hole supplies lubricating oil to the tapered roller from the end of the groove or the end of the hole that is connected with the axially inner end surface of the large-diameter-side annular part.

(3) The tapered roller bearing according to (2), in which a corner between the groove capable of retaining the lubricating oil and the axially inner end surface of the large-diameter-side annular part has a sharp edge.

(4) The tapered roller bearing according to (2), in which a groove bottom corner in a radial cross-section of the groove capable of retaining the lubricating oil is in an arc shape. The arc shape of the groove bottom corner includes a maximum arc portion of radius set to ¼ to ½ of a radial width of the groove.

(5) The tapered roller bearing according to (4), in which a radius of the arc shape of the groove bottom corner in the radial cross-section of the groove is decreased from a center toward the end of the groove.

(6) The tapered roller bearing according to (2), in which a depth of the end of the groove is smaller than a depth of a center of the groove.

(7) The tapered roller bearing according to (2), in which a width of the end of the groove is smaller than a width of a center of the groove.

(8) The tapered roller bearing according to (2), in which the axially inner end surface of the large-diameter-side annular part is in a shape such that more than half of the ends of the grooves provided on the axially inner end surface of the large-diameter-side annular part are contactable with the large-diameter side end surface of the tapered roller at the same time in the projection plane of the large-diameter-side end surface of the tapered roller on the axially inner end surface of the large-diameter-side annular part.

(9) The tapered roller bearing according to (1), in which the holder has at least one of a structure in which an inner circumferential surface of the large-diameter-side annular part is radially guided by an outer circumferential surface of a large flange part of the inner ring, and a structure in which an inner circumferential surface of the small-diameter-side annular part is radially guided by an outer circumferential surface of a small flange part of the inner ring.

(10) The tapered roller bearing according to (1), in which an opening angle of a circumferential side surface of the column part configuring the pocket is set to 0 to 40 degrees.

(11) The tapered roller bearing according to (1), in which the axially inner end surface of the large-diameter-side annular part is in a concave spherical shape, the large-diameter-side end surface of the tapered roller is formed in a convex spherical shape, and when the radius of curvature of the concave spherical shape of the axially inner end surface of the large-diameter-side annular part is SRy and the radius of curvature of the convex spherical shape of the large-diameter-side end surface of the tapered roller is Ra, SRy=Ra±20% Ra is set

(12) The tapered roller bearing according to (1), in which the axially inner end surface of the large-diameter-side annular part is in a concave shape along a circumferential direction or a radial direction, the large-diameter-side end surface of the tapered roller is in a convex spherical shape, and when the radius of curvature of concave shape of the axially inner end surface of the large-diameter-side annular part along a circumferential direction or a radial direction is Rz, and the radius of curvature of convex spherical shape of the large-diameter-side end surface of the tapered roller is Ra, Rz=Ra±20% Ra is set.

(13) The tapered roller bearing according to (1), in which the oil retaining part includes a stepped part capable of retaining lubricating oil.

(14) The tapered roller bearing according to any one of (1) to (13), in which the bearing is used under a lubricated environment where lubricating oil is intermittently supplied to inside of the bearing, or where there is an extremely small amount of lubricating oil in the bearing.

ADVANTAGEOUS EFFECTS OF INVENTION

According to the present invention, at least the axially inner end surface, among the surfaces of the large-diameter-side annular part of the holder, is rough, the oil retaining part retaining the lubricating oil is provided at the large-diameter-side annular part, and when the holder is moved axially to the small-diameter-side of the tapered roller, the oil retaining part comes into contact with the large-diameter-side end surface of the tapered roller, and as a result, the seizure of the bearing is prevented even under a lubricated environment with an extremely small amount of lubricating oil. When the holder is axially moved to the large-diameter-side of the tapered roller, the oil retaining part is separated away from the large-diameter-side end surface of the tapered roller, and the oil retaining part is not in constant contact with the tapered rollers, and accordingly, an increase in frictional resistance during rotation of the bearing is prevented, and wear of the oil retaining part is further prevented. It is not necessary to manage the dimensions of components with high precision, and the like, and an increase in manufacturing cost can be suppressed.

DESCRIPTION OF EMBODIMENTS

Hereinafter, respective embodiments of a tapered roller bearing according to the present invention will be described in detail with reference to the drawings.

First Embodiment

First, a first embodiment of a tapered roller bearing according to the present invention will be described with reference to FIGS. 1 to 24.

Figure 1:
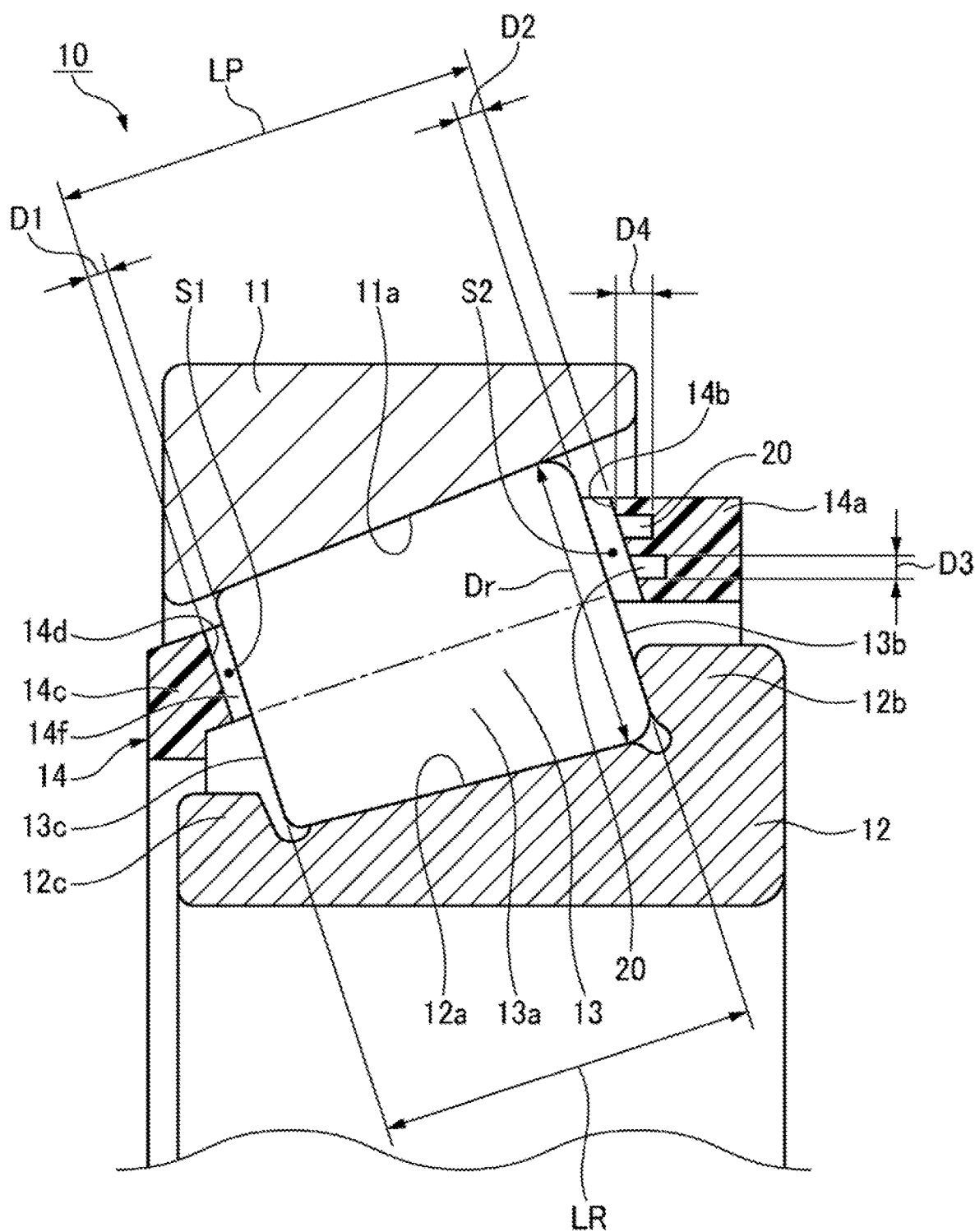
FIG. 1 is a cross-sectional view illustrating a first embodiment of a tapered roller bearing according to the present invention.
Figure 2:
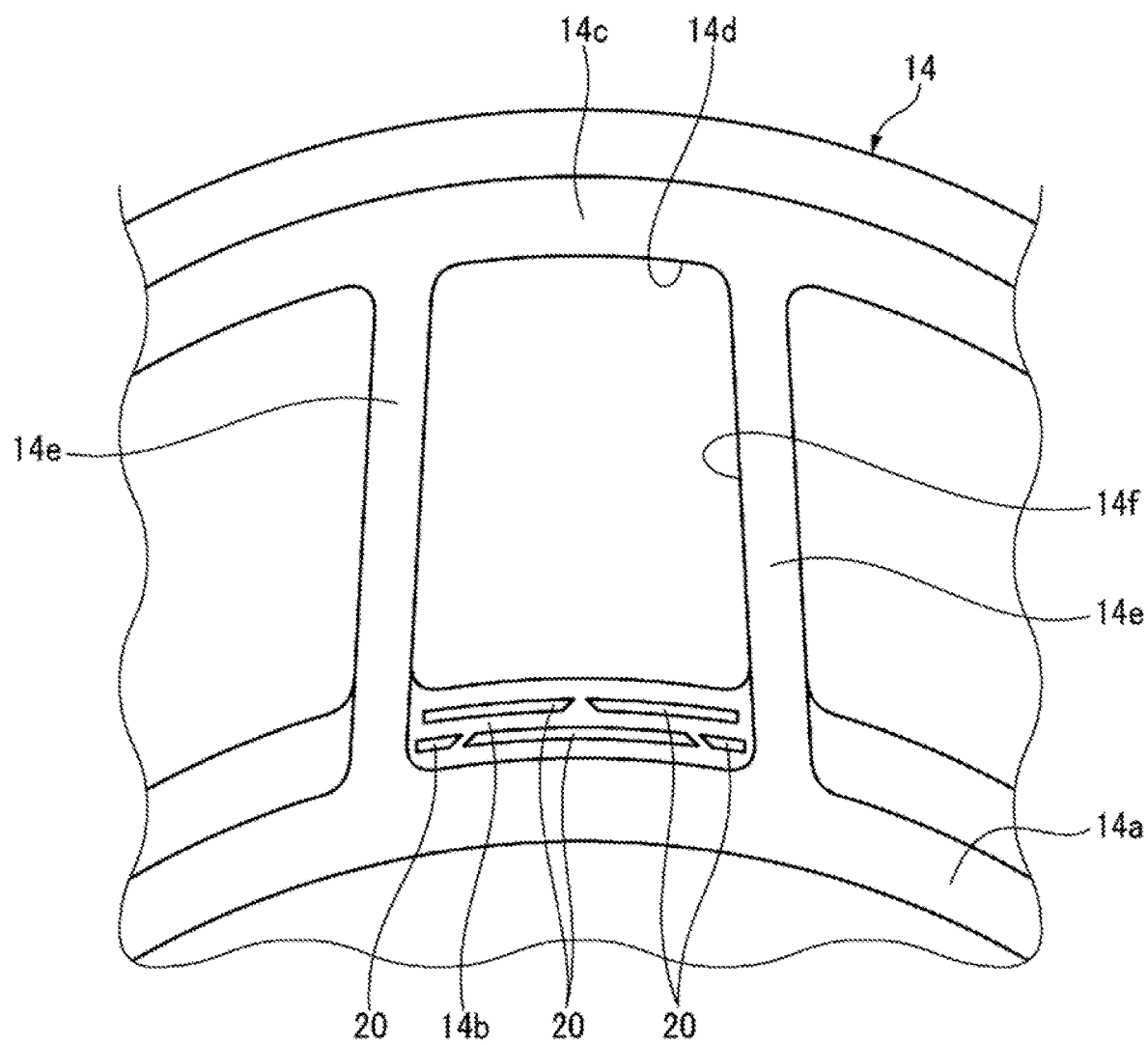
FIG. 2 is a schematic view showing the holder shown in FIG. 1 when viewed from the inside in the radial direction.

As shown in FIG. 1, the tapered roller bearing 10 of the present embodiment includes an outer ring 11 including an outer ring raceway surface 11a on an inner circumferential surface, an inner ring 12 including an inner ring raceway surface 12a on an outer circumferential surface, a plurality of tapered rollers 13 rotatably provided between the outer ring raceway surface 11a and the inner ring raceway surface 12a, and a holder 14 for holding the plurality of tapered rollers 13 at substantially equal intervals in the circumferential direction. In the present embodiment, lubricating oil is appropriately supplied to the inside of the bearing by a lubricating oil pump P or the like (see FIG. 31).

The inner ring 12 includes a large flange part 12b provided at a large-diameter-side end of the inner ring 12 and a small flange part 12c provided at a small-diameter-side end of the inner ring 12. The outer circumferential surface of the inner ring 12 is formed in a substantially tapered shape. The tapered roller 13 includes a rolling surface 13a provided on a circumferential surface of the tapered roller 13, a large-diameter-side end surface 13b provided at the large-diameter-side end of the tapered roller 13, and a small-diameter-side end surface 13c provided at the small-diameter-side end of the tapered roller 13.

The holder 14 is made of synthetic resin and is injection-molded by axial drawing, and includes a large-diameter-side annular part 14a, a small-diameter-side annular part 14c coaxially arranged with the large-diameter-side annular part 14a, a plurality of column parts 14e provided at substantially equal intervals in the circumferential direction and connecting the large-diameter-side annular part 14a and the small-diameter-side annular part 14c in the axial direction, and a pocket 14f formed between the column parts 14e adjacent to each other in the circumferential direction, while being surrounded by the large-diameter-side annular part 14a and the small-diameter-side annular part 14c, to hold the tapered roller 13 to be capable of rolling.

The holder 14 includes a first gap S1 between an axially inner end surface 14d of the small-diameter-side annular part 14c of the holder 14 and the small-diameter-side end surface 13c of the tapered roller 13. The holder 14 includes a second gap S2 between an axially inner end surface 14b of the large-diameter-side annular part 14a of the holder 14 and the large-diameter-side end surface 13b of the tapered roller 13. As a result, the holder 14 is provided movably within a predetermined range along the axial direction.

Then, as shown in FIG. 1, the tapered roller bearing 10 of the present embodiment has a relationship of Dt=D1+D2=LP−LR, where, the axial dimension of the first gap S1 is D1, the axial dimension of the second gap S2 is D2, the length dimension of the tapered roller 13 is LR, the length dimension of the pocket 14f of the holder 14 is LP, and the total dimension of the entire gap is Dt. The axial dimensions D1 and D2, the length dimension LR of the tapered roller 13, and the length dimension LP of the pocket 14f are the dimensions along the central axis (rotational axis) direction of the tapered roller 13.

As described above, since there is a gap provided in the axial direction between the tapered roller 13 and the holder 14, the holder 14 is freely movable along the axial direction within the range of the total dimension Dt of the gaps. In the present embodiment, the total dimension Dt of the gaps does not require strict dimension management, and accordingly, in consideration of general processing precision of the holder, it is set in a range from 0.1 mm to ⅕ of the length dimension LR of the tapered roller 13 or less.

The surface of the axially inner end surface 14b (hereinafter, also simply referred to as "pocket surface") of the large-diameter-side annular part 14a of the holder 14 is formed to be rough, with a specific surface roughness (arithmetic mean roughness) of the axially inner end surface 14b being set to 3 μm to 20 μm. The surface roughness of the axially inner end surface 14b may be formed rougher than that of the circumferential side surface of the column part 14e, for example.

Then, the roughness of the axially inner end surface 14b (pocket surface) of the large-diameter-side annular part 14a serves to guide the lubricating oil stored in the grooves 20 to be described below to the tapered roller 13. As a result, the oil retaining ability and oil supplying ability of the axially inner end surface 14b can be enhanced. The inner surface of the groove 20 described below is also preferably rough to enhance the oil retaining ability. Since the axially inner end surface 14b is provided perpendicular to a demolding direction at the time of molding the holder, even when the axially inner end surface 14b is rough, this does not hinder the mold releasing after molding. Note that the surface roughness of the axially inner end surface 14b may be set for the entire pockets 14f or for some of the pockets 14f.

As shown in FIGS. 1 to 5, a plurality of (five, in the present embodiment) fine grooves 20 (oil retaining part) are formed on the axially inner end surface 14b (pocket surface) of the large-diameter-side annular part 14a of the holder 14 by groove processing or the like. The number of the grooves 20 may be one. The five grooves 20 are arranged in two rows (two on the outer diameter-side and three on the inner diameter-side). The grooves 20 are bottomed grooves, and are formed in parallel in the circumferential direction in each pocket 14f. The grooves 20 are the oil retaining part that is capable of retaining the lubricating oil with a capillary force, and enhance the oil retaining ability of the holder 14 and promote the propagation of the lubricating oil to the tapered rollers 13. Note that the grooves 20 may be provided for the entire pockets 14f, or may be provided for some of the pockets 14f.

Hereinafter, the capillary force described in this description is a force of the solid attracting liquid. When the surface tension of the solid (holder) is greater than the surface tension of the liquid (lubricating oil), a capillary force is generated and the liquid is attracted to the solid surface. By the surface tension, the liquid tends to reduce the surface contacting with air. That is, the lubricating oil tends to reduce a contact area with the air, while increasing a contact area with the holder. Therefore, a thinner and narrower groove of the holder results in a higher capillary force. In the present invention, in order to utilize this principle, the thin and narrow groove 20 is formed in the pocket surface 14b. The grooves 20 are characterized such that the lubricating oil is supplied to the large-diameter-side end surface 13b of the tapered roller 13 from groove ends 20a that are connected with the axially inner end surface 14b (pocket surface) of the large-diameter-side annular part 14a. The groove ends 20a are the ends of the groove 20 in the circumferential direction. A groove center 20b to be described below is a center of the groove 20 in the circumferential direction.

The grooves 20 need to have a fine shape that is capable of retaining oil and supplying the oil to the tapered rollers 13 by the action of the capillary force, and in the present embodiment, the width and depth of the groove 20 are set to be constant, or set in a manner that the groove ends are shallow, and in consideration of the oil retaining property of the lubricating oil of the groove 20, the strength of the holder 14 and the precision of general injection molding, the radial width D3 of the groove 20 are set in a range from 0.01 mm to 0.5 mm at the maximum portion, and the depth D4 of the groove 20 are set in a range from 0.05 mm to ⅕ of the length dimension LR of the tapered roller 13 or less at the maximum portion, for example. Note that the radial width D3 of the groove 20 is the width in a direction orthogonal to the extending direction of the groove 20. The grooves 20 formed by the axial drawing are extended in the same direction (axial direction) as the central axis of the holder 14, which is the direction in which the molding die is moved (released) during injection molding.

The holder 14 is made of synthetic resin and can be injection-molded by axial drawing. The surface roughness of the axially inner end surface 14b (pocket surface) of the large-diameter-side annular part 14a and the grooves 20 may also be formed at the same time by the injection molding. Here, additional processing steps, special molding such as two-color molding (double molding), adhesion of separately manufactured oil retaining members, and the like are unnecessary. Accordingly, the seizure resistance can be improved without substantially increasing the manufacturing cost.

The material for the holder 14 is not particularly limited and may be any synthetic resin material having a lipophilicity which generates a capillary force with high surface tension with respect to the lubricating oil used, and may include general holder resin material such as nylon, for example. The synthetic resin of the holder 14 may contain fibers as a reinforcing agent. Resin material having low lipophilicity may be used, but here, it is preferable to perform lipophilic treatment.

Figure 5:
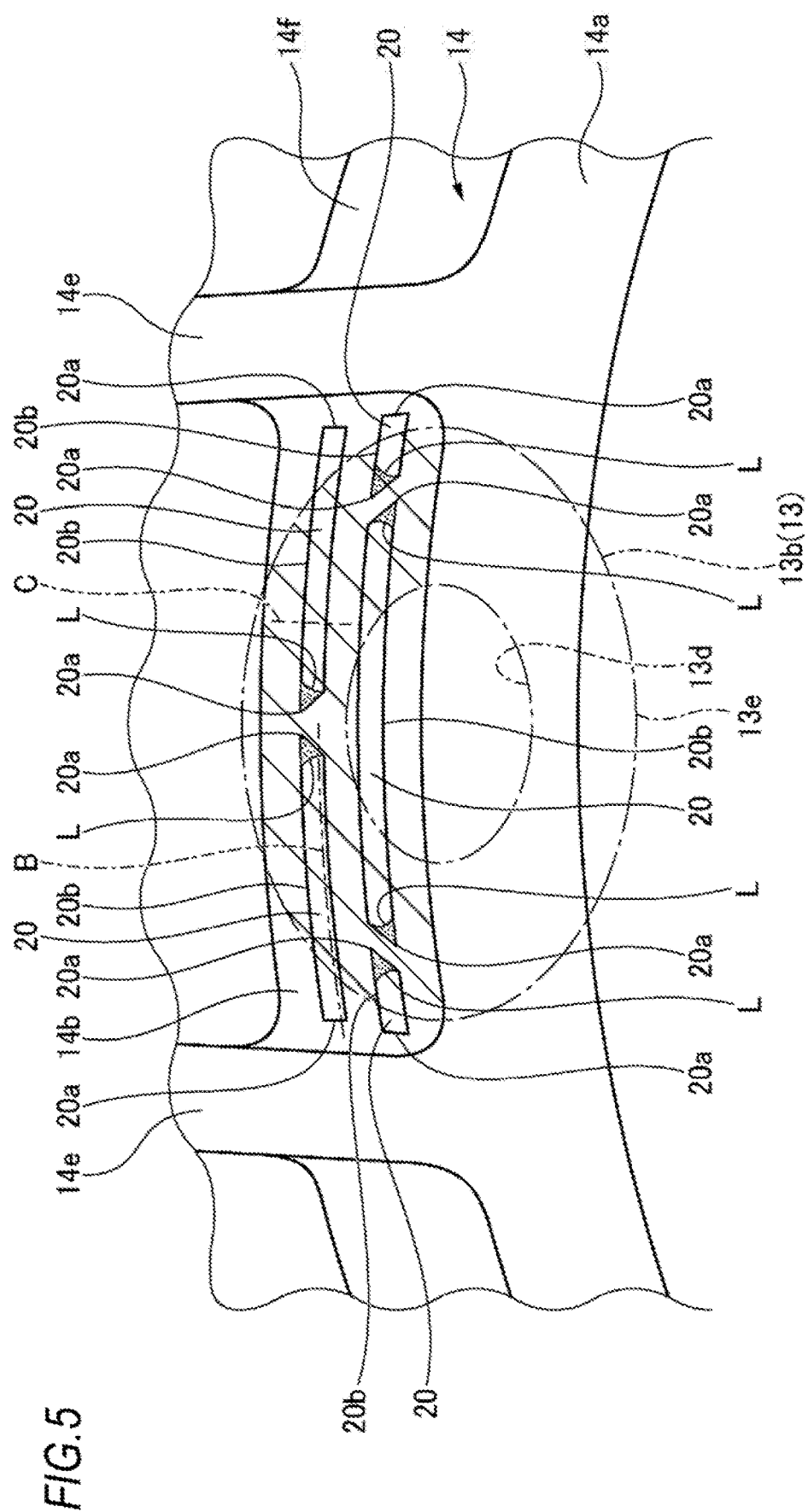
FIG. 5 is a schematic diagram showing a relationship of position of contacts between a groove end of a groove in a circumferential direction and the large-diameter-side end surface of the tapered roller.

FIG. 5 is a schematic diagram showing a relationship of position of contacts between groove ends 20a of the groove 20 in the circumferential direction and the large-diameter-side end surface 13b of the tapered roller 13. The large-diameter-side end surface 13b of the tapered roller 13 is usually provided with a clearance recess 13d at the center thereof, and an annular contact surface 3e is provided around the clearance recess 13d. The projection plane of the annular contact surface 13e on the pocket surface 14b (the overlapping plane when viewed in the longitudinal direction of the tapered roller 13, see the hatched portion in FIG. 5) is a plane on which the tapered roller 13 and the holder 14 may come into contact with each other. Then, at least one of the groove ends 20a of the respective five grooves 20 is provided to correspond to a fan-shape area of the contact surface 13e. As a result, by the mechanism described below, the lubricating oil collected in the groove end 20a may be supplied to the tapered roller 13 without leaving residue, by the capillary force with the tapered roller 13. Note that the symbol L in FIGS. 5 to 8 denotes the lubricating oil (a portion marked with dots).

Figure 6A:
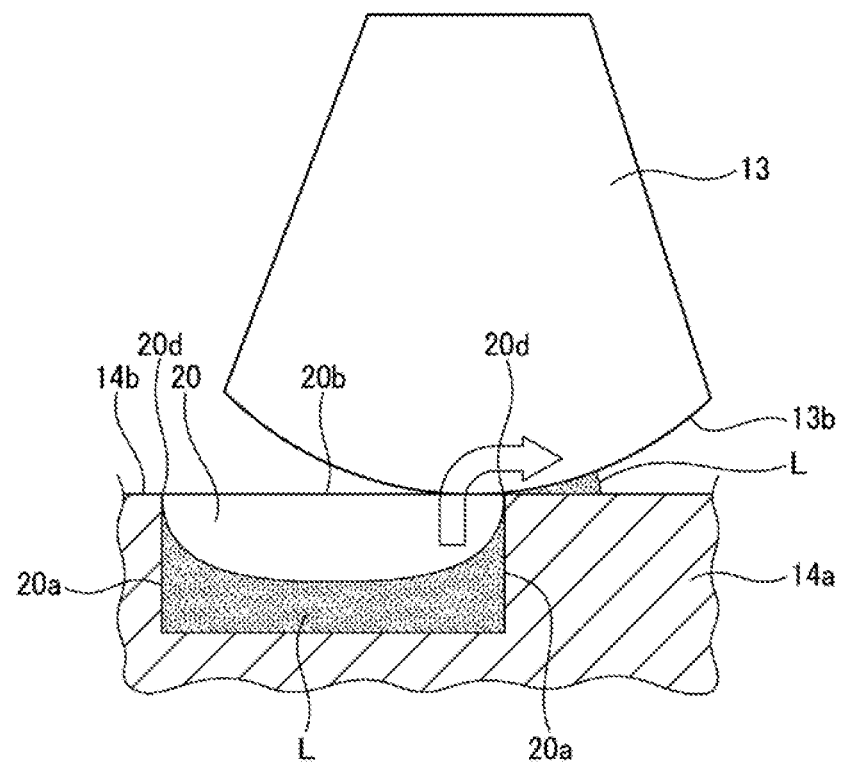
FIG. 6A is an explanatory diagram showing the groove end in contact with the tapered roller.
Figure 6B:
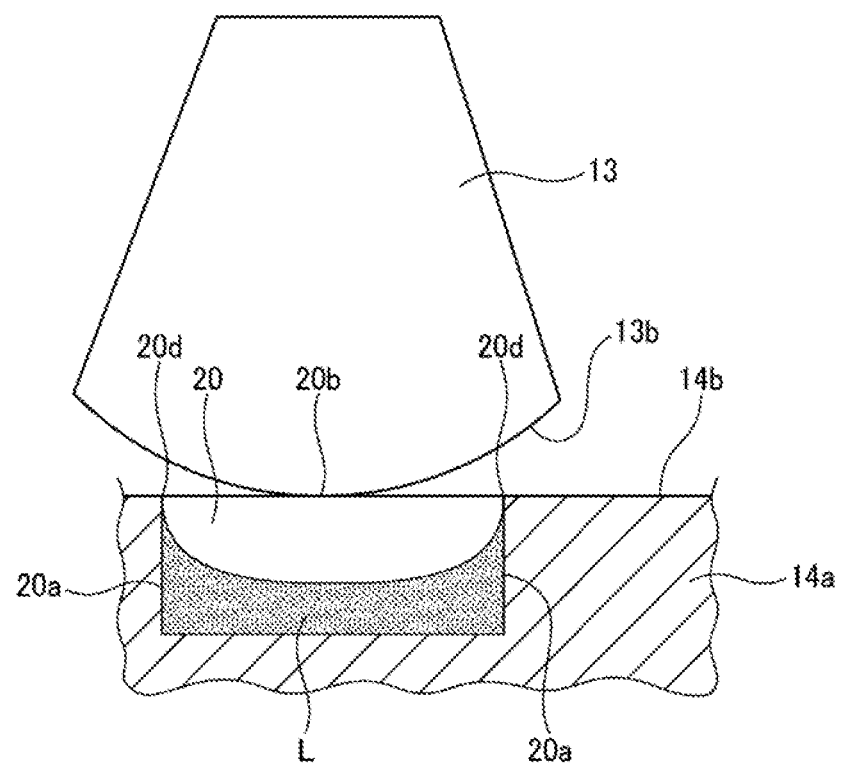
FIG. 6B is an explanatory diagram showing the groove end not in contact with the tapered roller.

FIGS. 6A and 6B are explanatory views showing a positional relationship between the longitudinal direction (circumferential direction) of the groove 20 and the tapered roller 13, which are cross-sectional views taken along the line B of FIG. 5, for example. Note that, in FIGS. 6A and 6B, the depth of the groove 20 is shown to be greater than the actual depth in order to facilitate understanding of the description. The holder 14 is characterized in that the lubricating oil stored inside the grooves 20 by the capillary force is supplied to the large-diameter-side end surface 13b of the tapered roller 13 by the action of the capillary force with the roller surface. In order to effectively achieve this action, it is important that the grooves 20 are provided to generate a high capillary force at the portion where the tapered roller 13 and the pocket surface 14b come into contact with each other. Therefore, one of the methods in the present embodiment is to configure such that a groove end 20a having a higher capillary force than the middle portion of the groove 20 comes into contact with the tapered roller 13. As a result, the lubricating oil inside the grooves 20 can be drawn up by the capillary force between the groove end 20a and the large-diameter-side end surface 13b of the tapered roller 13. In FIG. 6B, since the groove end 20a is not in contact with the tapered roller 13, the amount of drawing up the lubricating oil is decreased.

Figure 7A:
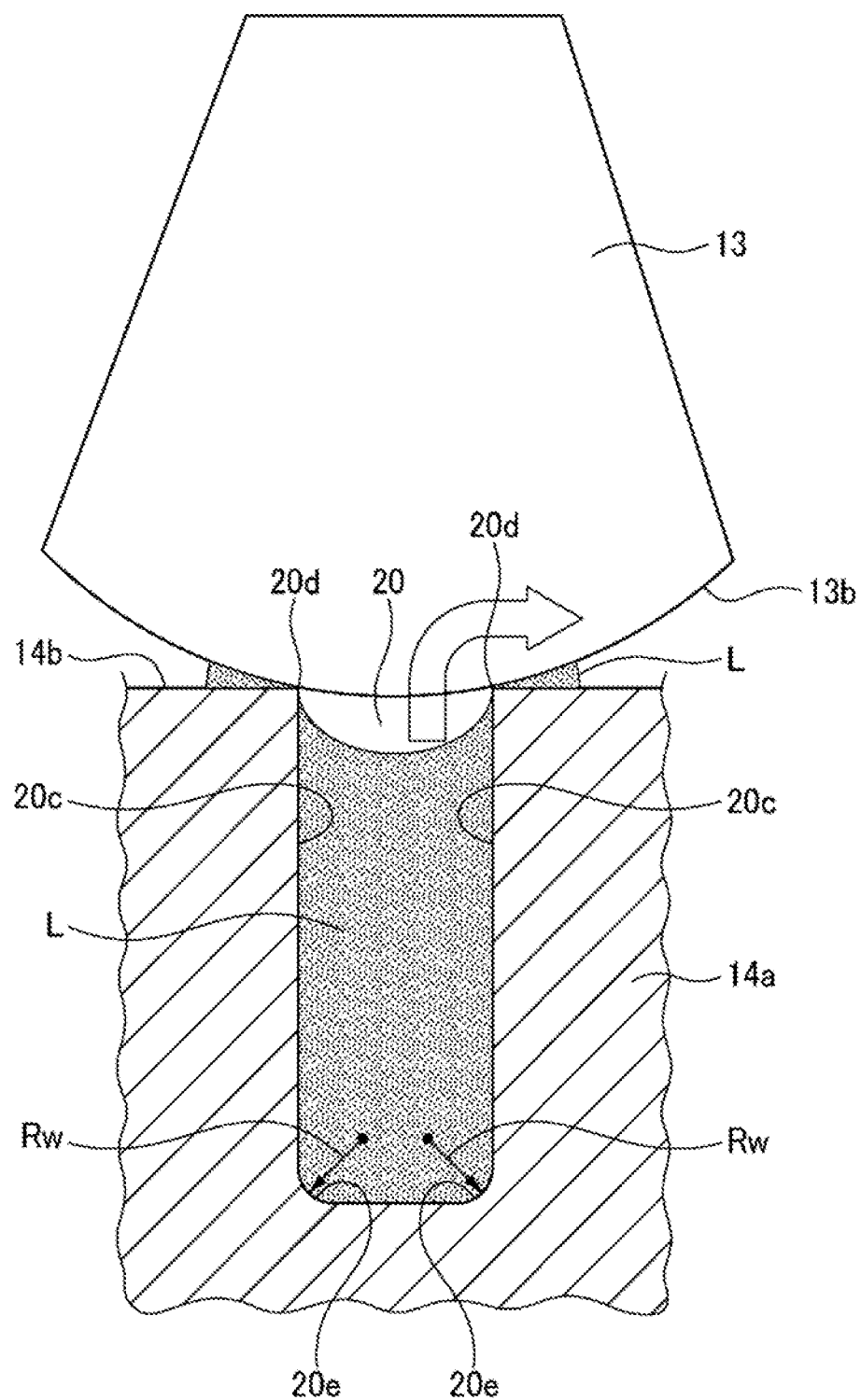
FIG. 7A is an explanatory diagram showing an example in which a corner of the groove is formed as a sharp edge.
Figure 7B:
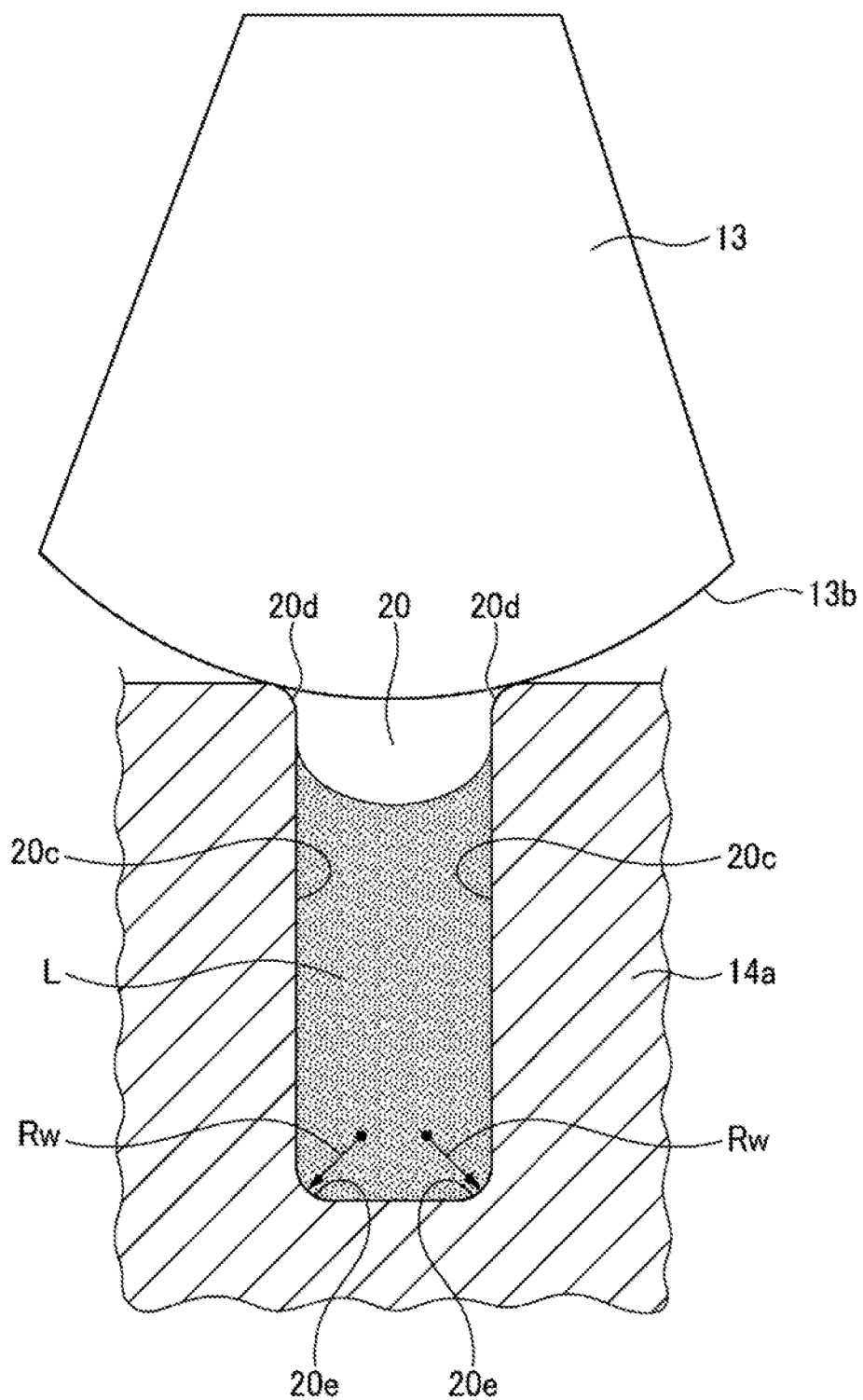
FIG. 7B is an explanatory diagram showing an example in which the corner of the groove is formed in a large arc shape.

FIGS. 7A and 7B are explanatory views showing the radial cross-sectional shape of the groove 20, which are cross-sectional views taken along the line C of FIG. 5, for example. As is also clear from the capillary phenomenon and the like, the capillary force is stronger in a narrower space, and accordingly, the radial width D3 of the groove 20 should be thin and the groove 20 should not be wide at the opening as shown in FIG. 7B. Therefore, in the present embodiment, as shown in FIG. 7A, a corner 20d between a wall surface 20c (at least one of the radial wall surface and the circumferential wall surface of the groove 20) of the groove 20 and the pocket surface 14b is formed with a sharp edge (an arc-shaped chamfer with a radius of 0.1 mm or less, preferably, an arc-shaped chamfer with a radius of 0.05 mm or less, or a linear chamfer of 45 degrees with a side of 0.1 mm). Forming the corner 20d as the sharp edge makes it easy to guide the lubricating oil to the pocket surface 14b. Note that, in FIG. 7B, since the arc of the corner 20d is large, the oil surface of the lubricating oil does not reach the pocket surface 14b, and the amount of oil supply is decreased.

Figure 9:
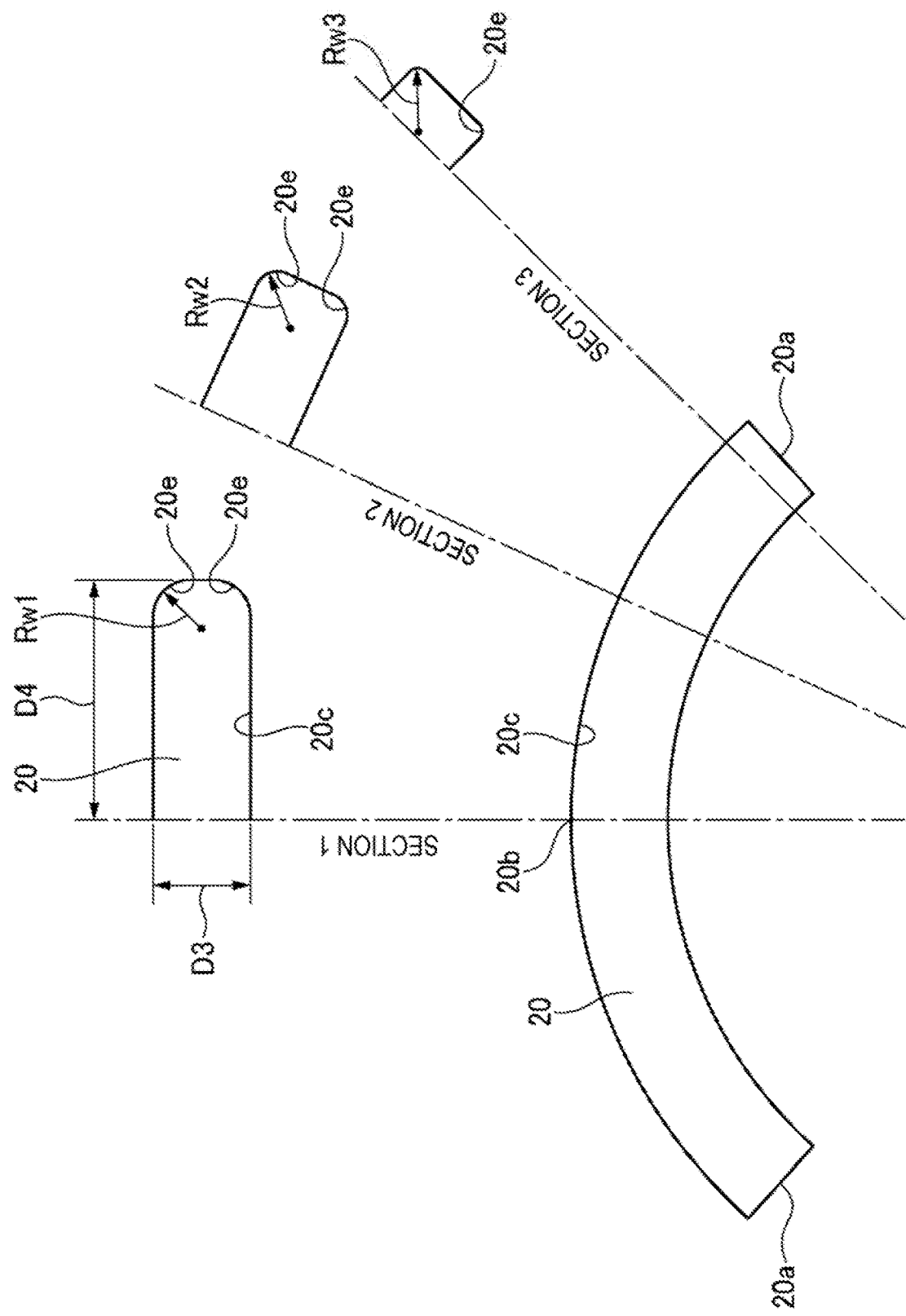
FIG. 9 is a schematic diagram illustrating that a radius of an arc shape of a groove bottom corner of a radial cross section of the groove is decreased from the groove center of the groove toward the groove end.

A groove bottom corner 20e in the radial cross-section of the groove 20 is formed in an arc shape, and when the radius Rw of the arc shape of the groove bottom corner 20e is small, a high capillary force is exerted so that the lubricating oil stays in the groove bottom corner 20e. Therefore, the radius Rw of the arc shape of the groove bottom corner 20e in the radial cross-section of the groove 20 is desirably set to ¼ to ½ of the radial width D3 of the groove 20 at the groove center 20b having a maximum value which is the center of the groove 20 in the longitudinal direction. In order to increase the capillary force toward the groove ends 20a, as shown in FIG. 9, it is more desirable that the radius Rw of the arc shape of the groove bottom corner 20e in the radial cross-section of the groove 20 is formed smaller as it goes from the groove center 20b to the groove ends 20b of the groove 20 (Rw1>Rw2>Rw3). As a result, the lubricating oil remaining in the groove center 20b can be drawn up to the groove ends 20a having a higher capillary force and guided to the pocket surface 14b.

Figure 8A:
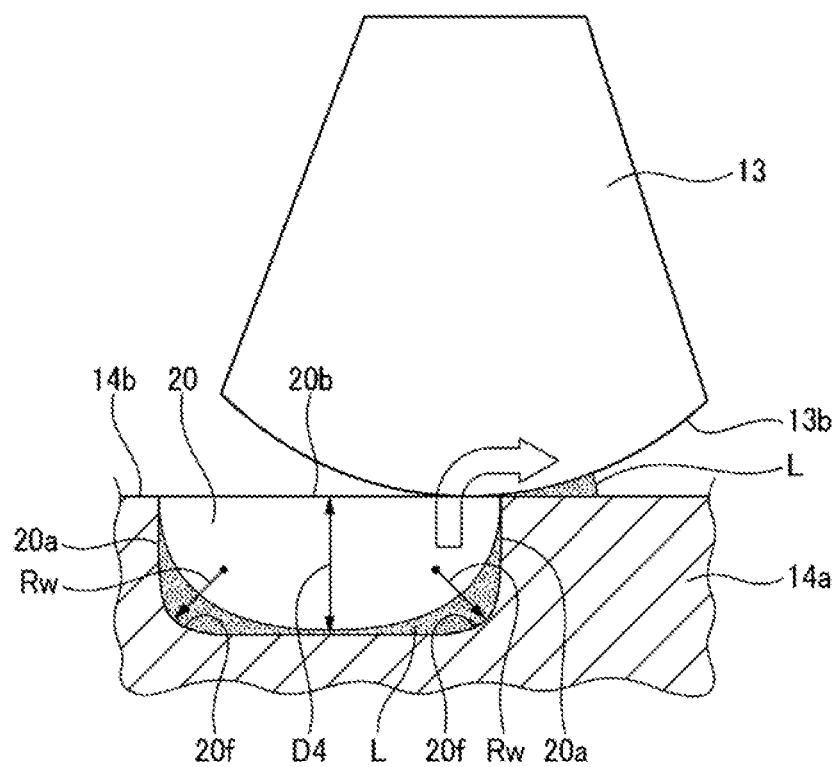
FIG. 8A is an explanatory diagram showing an example in which a depth of the groove is decreased from a groove center of the groove toward a groove end.
Figure 8B:
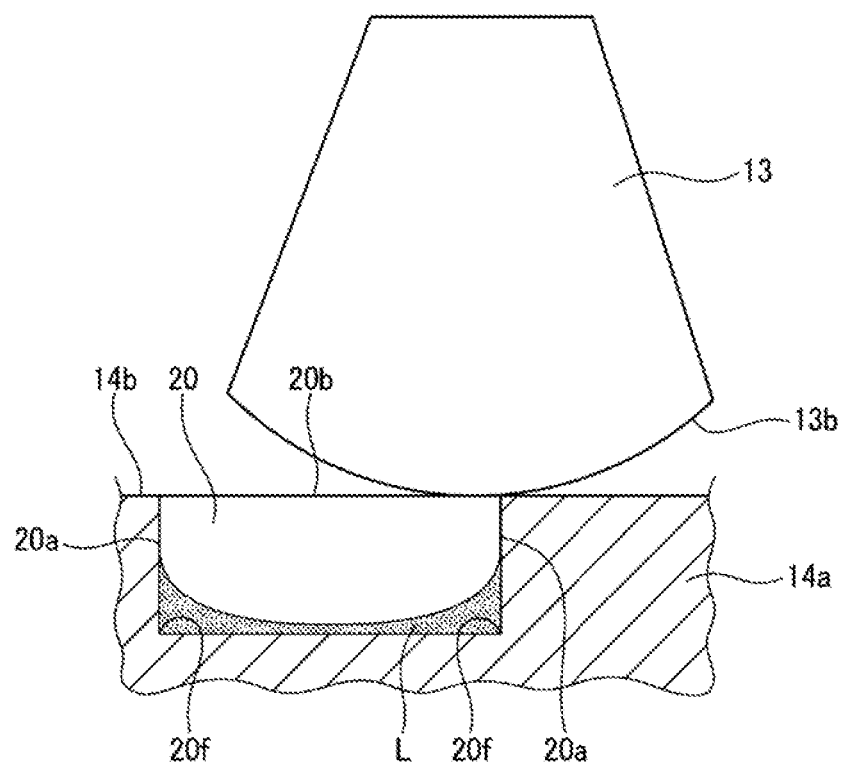
FIG. 8B is an explanatory diagram showing an example in which the depth of the groove is formed uniformly from the groove center of the groove to the groove end.

FIGS. 8A and 8B are explanatory views showing the cross-sectional shape of the groove 20 in the longitudinal direction (circumferential direction), which are cross-sectional views taken along the line B of FIG. 5. Note that, in FIGS. 8A and 8B, the depth of the groove 20 is shown to be greater than the actual depth in order to facilitate understanding of the description. As shown in FIG. 8B, when the radius Rw of a groove bottom corner 20f of the groove 20 in the circumferential cross-section is small, the lubricating oil remains in the groove bottom corner 20f, making it difficult to supply the oil to the tapered roller 13. Therefore, it is desirable to set the depth D4 of the groove ends 20a to be smaller (shallower) than the depth D4 of the groove center 20b. Specifically, as shown in FIG. 8A, the groove bottom corner 20f of the groove 20 in the circumferential cross-section is formed in an arc shape, and the depth D4 of the groove 20 is formed smaller as it goes from the groove center 20b of the groove 20 toward the groove ends 20a. As a result, the capillary force at the portion of the groove ends 20a coming into contact with the pocket surface 14b can be increased, and the lubricating oil remaining at the groove bottom can be efficiently drawn up and supplied to the tapered roller 13.

Figure 10:
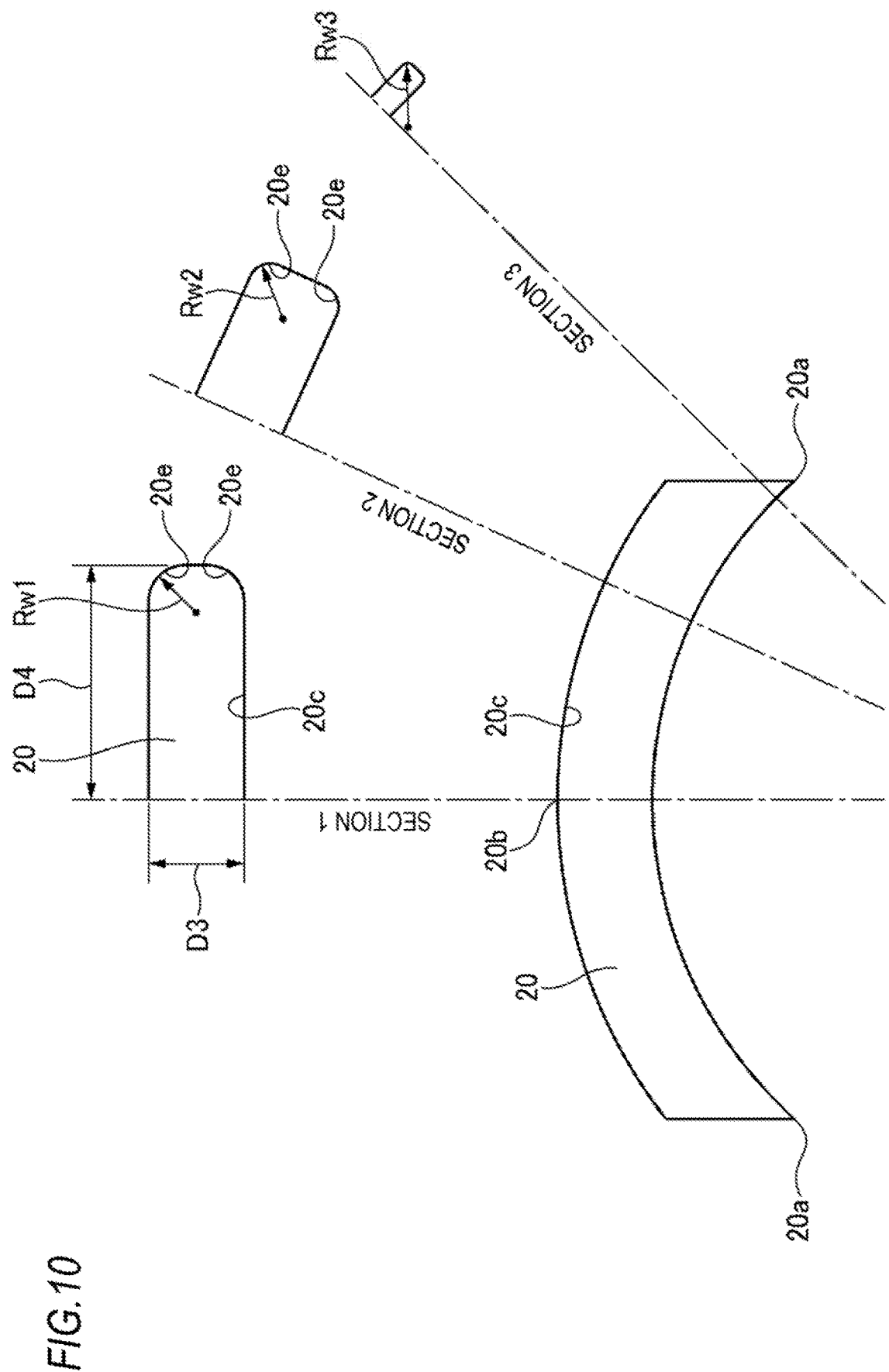
FIG. 10 is a schematic diagram illustrating an example in which a radial width of the groove is reduced at both groove ends in a longitudinal direction.

FIG. 10 is a schematic diagram illustrating an example in which the radial width D3 of the groove 20 is reduced (thinned) at both groove ends 20a in the longitudinal direction. That is, in the groove 20 shown in FIG. 10, the radial width D3 of the groove ends 20a is set to be smaller than the radial width D3 of the groove center 20b. As described above, by making a tip of the groove 20 thin, the capillary force at the groove ends 20a can be increased, and the lubricating oil remaining at the groove bottom can be efficiently drawn up and supplied to the tapered roller 13. Since the narrowed portion is limited to a portion of the tip, this is a shape that can easily store a large amount of lubricating oil without greatly reducing the spatial volume of the entire groove.

Figure 11:
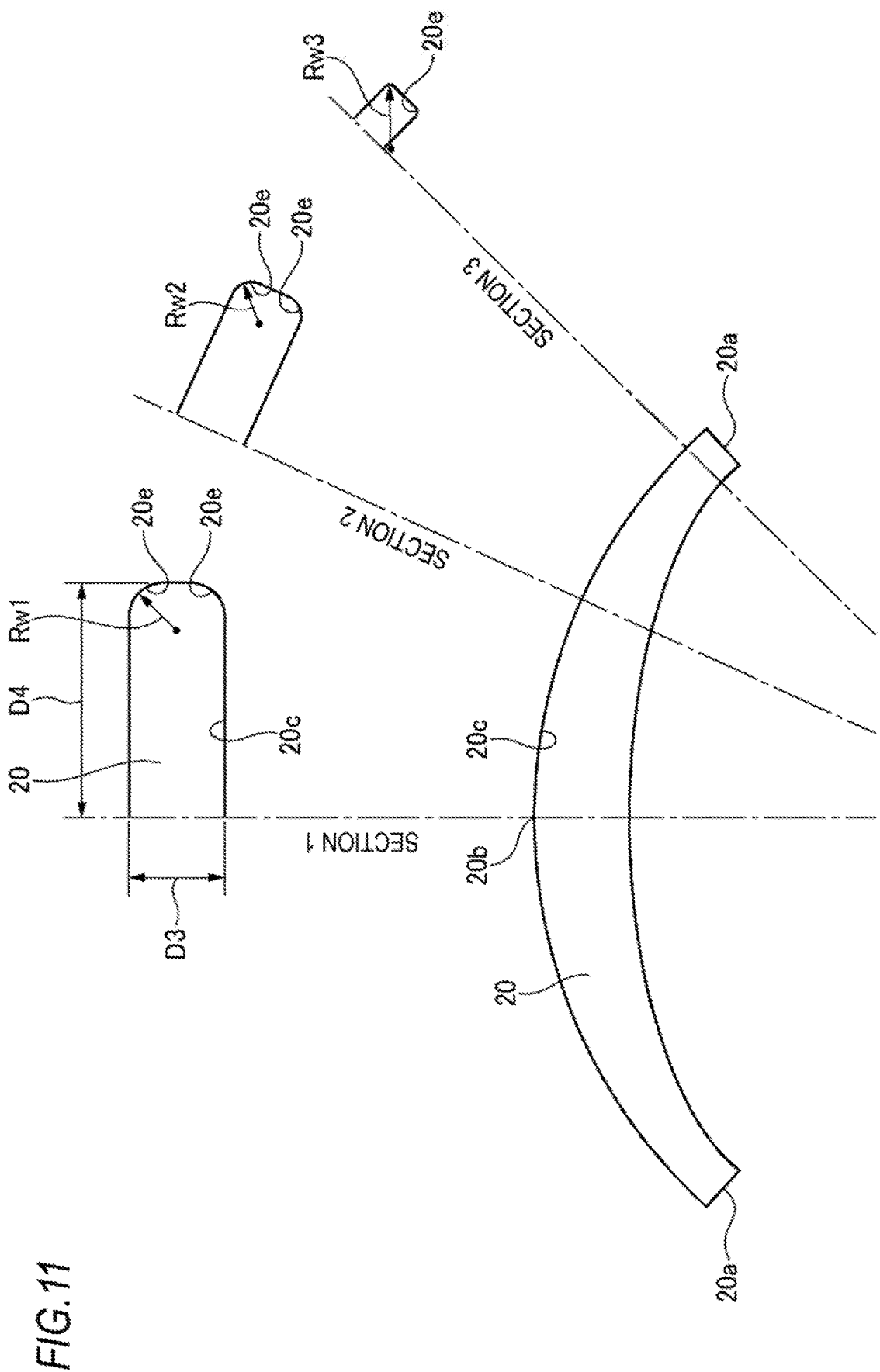
FIG. 11 is a schematic diagram illustrating another example of the shape of the groove.
Figure 12:
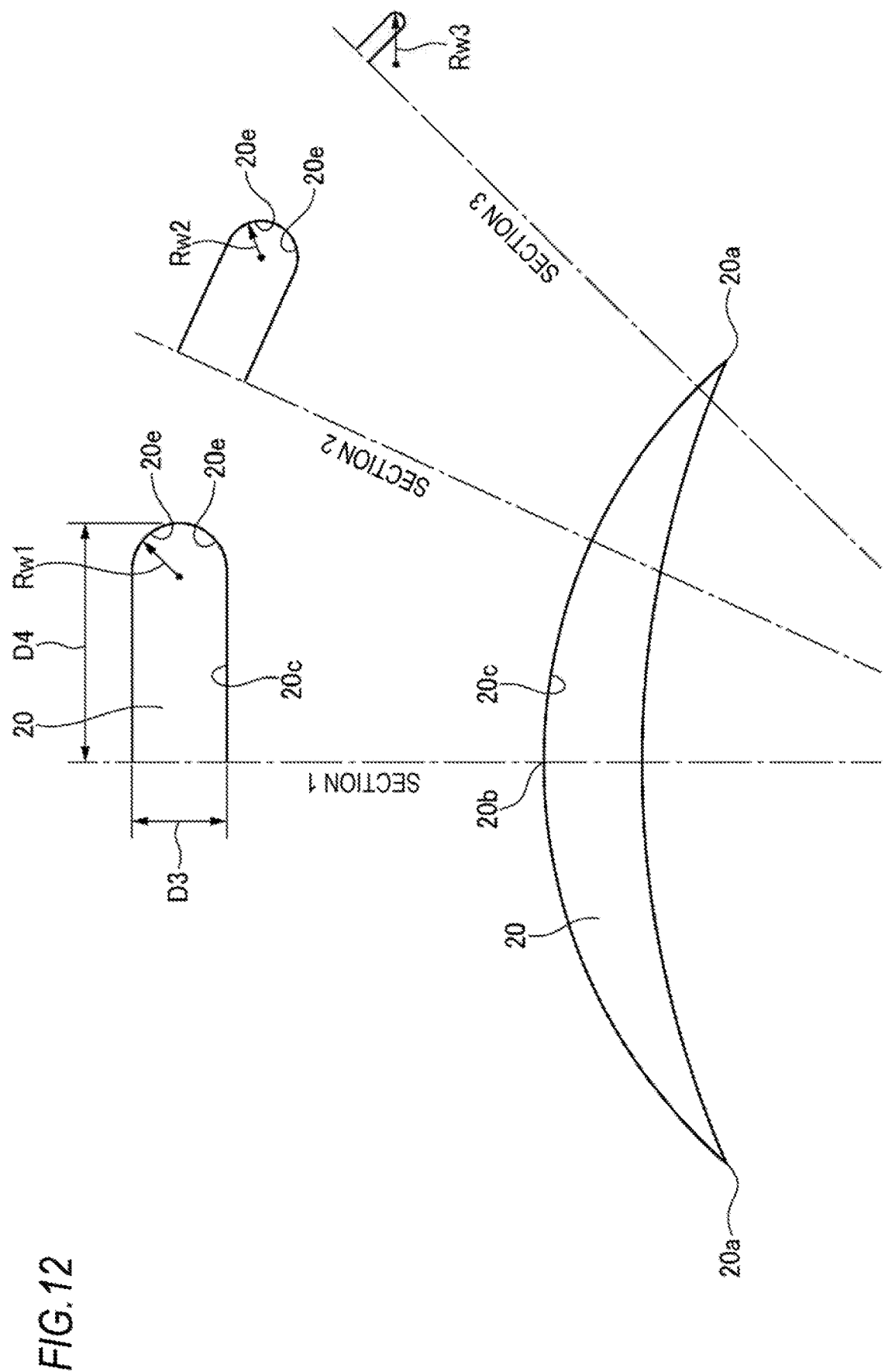
FIG. 12 is a schematic diagram illustrating another example of the shape of the groove.

FIGS. 11 and 12 are schematic diagrams illustrating another example of the shape of the groove 20. In the grooves 20 shown in FIG. 11 and FIG. 12, the radial width D3 of the groove 20 is formed smaller as it goes from the groove center 20b toward the groove ends 20a, the depth D4 of the groove 20 is formed shallower as it goes from the groove center 20b to the groove ends 20a, and the radius Rw of the arc shape of the groove bottom corner 20e in the radial cross-section of the groove 20 is formed smaller (Rw1>Rw2>Rw3) as it goes from the groove center 20b of the groove 20 toward the groove ends 20a. With such a structure, the capillary force at the portion of the groove ends 20a coming into contact with the pocket surface 14b can be increased, and the lubricating oil remaining at the groove bottom can be efficiently drawn up and supplied to the tapered roller 13. Note that the circumferential length of the groove 20, the degree of change in the radial width D3 of the groove 20, the degree of change in the depth D4 of the groove 20, the degree of change in the radius Rw of the arc shape of the groove bottom corner 20e in the radial cross-section of the groove 20, and the continuity/discontinuity of the change may be freely set. Only some of the items described above may be employed.

Figure 13:
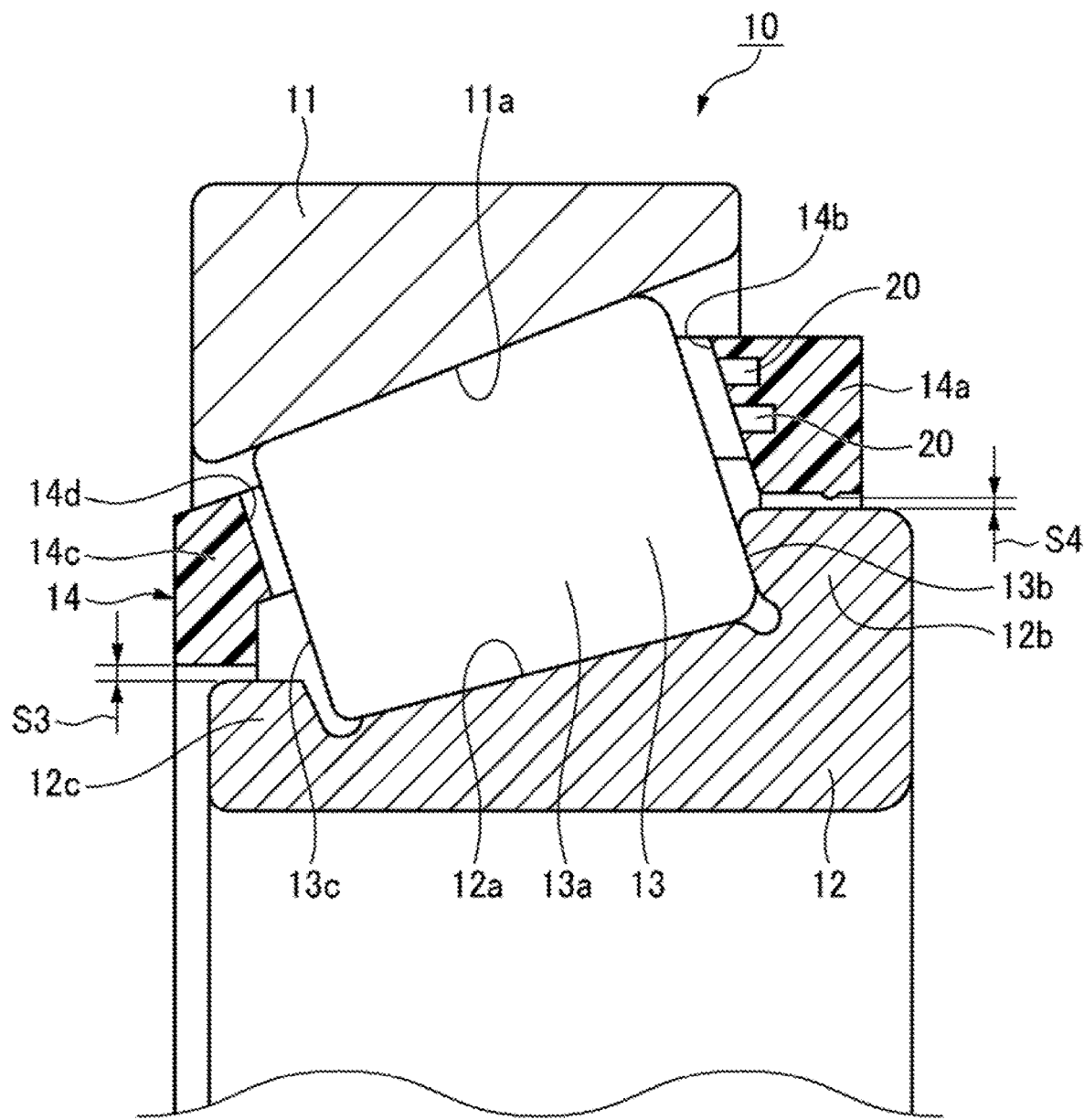
FIG. 13 is a cross-sectional view showing a state of a radial gap between the holder and an inner ring.

FIG. 13 is a cross-sectional view showing a state of a radial gap between the holder and the inner ring. The holder is a component that rotates synchronously with the revolution of the roller, and is configured to be restricted in the radial movement by any of the inner ring, the outer ring, and the rollers. In a general tapered roller bearing, movement in the radial direction is restricted by the roller, and free movement is enabled in the radial direction within a range of a gap provided in the pocket. However, with the restriction by the roller, it is difficult to have the amount of movement in the radial direction limited within a narrow range because there are many factors that cause variations in the radial position. When the amount of movement of the holder in the radial direction is increased, the position of contact between the pocket surface and the end surface is also largely deviated, and so the effect of lubrication is decreased.

Therefore, in the present invention, a sliding bearing structure is used, in which a gap between the inner circumferential surface of the annular part of the holder and the outer circumferential surface of the flange part of the inner ring is formed small, allowing a reduced amount of movement of the holder in the radial direction. Specifically, as shown in FIG. 13, the holder 14 has both a structure in which the inner circumferential surface of the large-diameter-side annular part 14a is radially guided by the outer circumferential surface of the large flange part 12b of the inner ring 12, and a structure in which the inner circumferential surface of the small-diameter-side annular part 14c is radially guided by the outer circumferential surface of the small flange part 12c of the inner ring 12. Note that the present invention is not limited to having both of the two structures described above, and may have one of the two structures.

In the above sliding bearing structure, the radial movement of the holder is restricted by the outer circumferential surface of the flange part of the inner ring, and in order to ensure such restriction, the structure is configured such that, while the holder is eccentric when in contact with the flange part, the holder and the roller are in contact with each other, but not restricted in the movement in the radial direction. Such structure is generally called an inner ring guided holder in which the inner ring guide is combined with the holder including grooves for oil retention/lubrication of the present invention, which is capable of exhibiting an effective lubrication function.

As shown in FIG. 13, regarding a third gap S3 between the inner circumferential surface of the large-diameter-side annular part 14a and the outer circumferential surface of the large flange part 12b of the inner ring 12, and a fourth gap S4 between the inner circumferential surface of the small-diameter-side annular part 14c and the outer circumferential surface of the small flange part 12c of the inner ring 12, while the gap sizes are not constant because an optimal design is required for each application in consideration of the size of the bearing, the materials for the holder and bearing, and the operating environment temperature, it is optimal to set a just zero gap or leave a slight gap between the holder and the inner ring at the lowest temperature of the operating environment. This is because the resin of the holder has a higher linear expansion coefficient than that of the bearing made of steel and the gap is decreased at low temperatures. The variance in the gap is increased as the difference in the linear expansion coefficients, the operating temperature range, and the holder guide diameter are increased. When the gap between the holder and the inner ring has a negative value, the holder is restricted by the inner ring, and thus is restricted from rotating smoothly. Therefore, it is important to ensure that the guide gap does not have a negative value. Since it is desirable that the gap is minimal during use, the gap setting described above is optimal.

Figure 14:
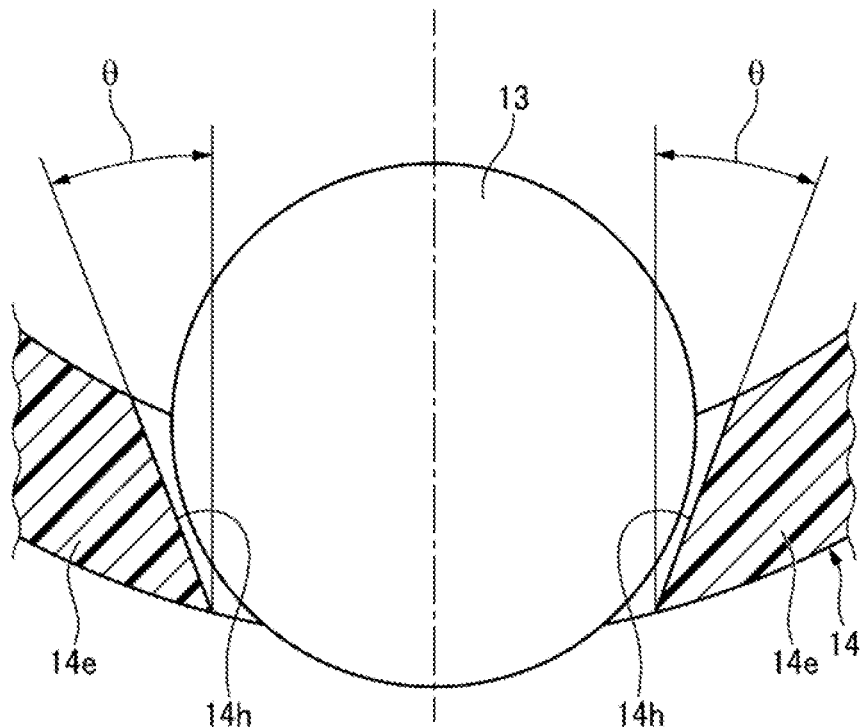
FIG. 14 is a schematic cross-sectional view illustrating an opening angle of a circumferential side surface of a column part.
Figure 15:
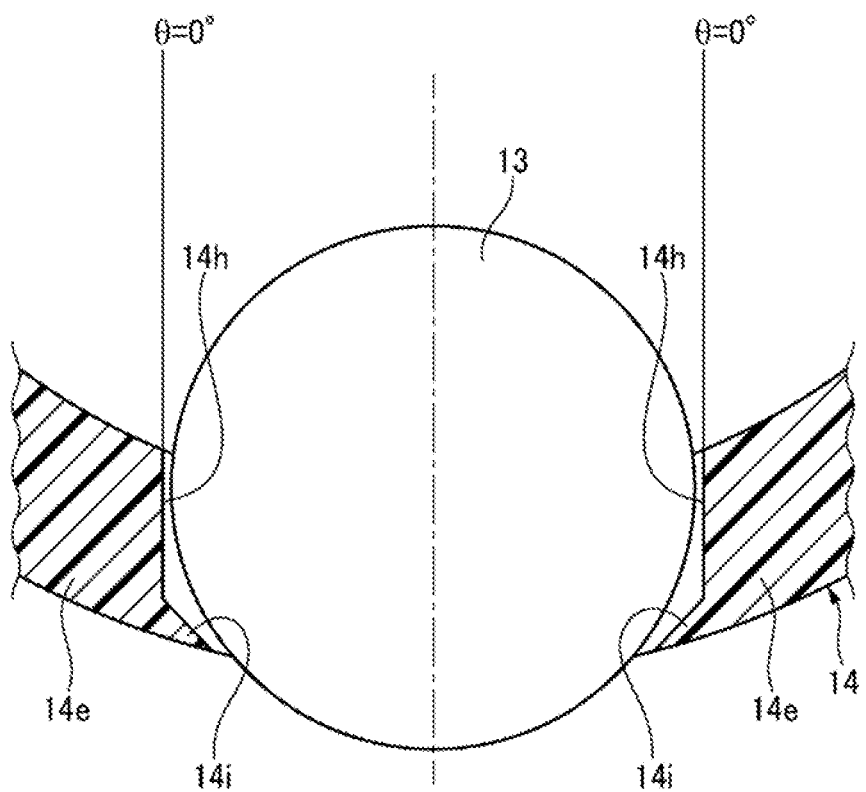
FIG. 15 is a schematic cross-sectional view illustrating an example in which the opening angle of the circumferential side surface of the column part is 0 degree.

FIGS. 14 and 15 are cross-sectional views showing the tapered roller 13 and the column part 14e of the holder 14 when viewed in the axial direction. As shown in FIGS. 14 and 15, the column parts 14e that face each other in the circumferential direction with the tapered roller 13 interposed therebetween are configured such that an outer-diameter-side gap is narrower than a roller diameter of the tapered roller 13, and as a result, a structure is provided, in which the tapered roller 13 does not fall out from the pocket 14f. Once the bearing is incorporated in the device to be used, the roller is interposed between the inner ring and the outer ring and accordingly, the roller will not be separated even without the holder, but before assembling into the device to be used, that is, while the assembly of the inner ring, roller/holder is separate from the outer ring, the above structure is adopted to prevent the assembly from being disassembled.

However, when the opening angle θ with respect to the radial direction of the circumferential side surface 14h of the column part 14e is increased, during use, the holder is subject to an increased component force in the radial direction of the holder, which is generated from the force in the roller revolution direction that is received by the contact with the roller. Since the behavior of the rollers among the rollers is not uniform, the force in the radial direction of the holder, which is generated in the entire pockets of the holder is also nonuniform, and this causes the center axis of the holder to deviate from the center axis of rotation. When the center axis of the holder deviates from the center axis of rotation, since the position of contact between the pocket surface 14b and the large-diameter-side end surface of the tapered roller 13 is also deviated, the deviation of the center axis of the holder should be prevented as much as possible. Therefore, it is desirable that the opening angle θ of the circumferential side surface 14h of the column part 14e forming the pocket 14f be set to 0 to 40 degrees. As shown in FIG. 15, a structure having a small opening angle such as 0 degree may be realized by providing, at the radially outer end of the circumferential side surface 14h of the column part 14e, a protrusion 14i for narrowing the window width to prevent the roller from falling out, and separating the roller fall-out preventing part from the position of contact between the column parts in use and the roller.

As shown in FIG. 5, since the large-diameter-side end surface 13b of the tapered roller 13 and the pocket surface 14b are in contact with each other at a fan-annular contact surface 13e of the tapered roller 13, and since the lubricating oil is supplied to the tapered roller 13 from the groove ends 20a inside the contact surface 13e by the capillary force, it is necessary to bring the groove ends 20a and the large-diameter-side end surface 13b of the tapered roller 13 into contact with each other. Therefore, for example, while the lubrication function may work even at one location, in order to perform sufficient lubrication, the axially inner end surface 14b (pocket surface) of the large-diameter-side annular part 14a is desirably formed in a shape such that more than half of the groove ends 20a of the five grooves 20, provided in the pocket surface 14b within a projection plane of the large-diameter-side end surface 13b of the tapered roller 13 onto the pocket surface 14b, can contact the large-diameter-side end surface 13b of the tapered roller 13 at the same time. In the case of FIG. 5, the five grooves 20 are arranged in two rows (two on the outer diameter side and three on the inner diameter side), and six groove ends 20a, among the ten groove ends 20a in total, are in contact with the large-diameter-side end surface 13b of the tapered roller 13.

Figure 16:
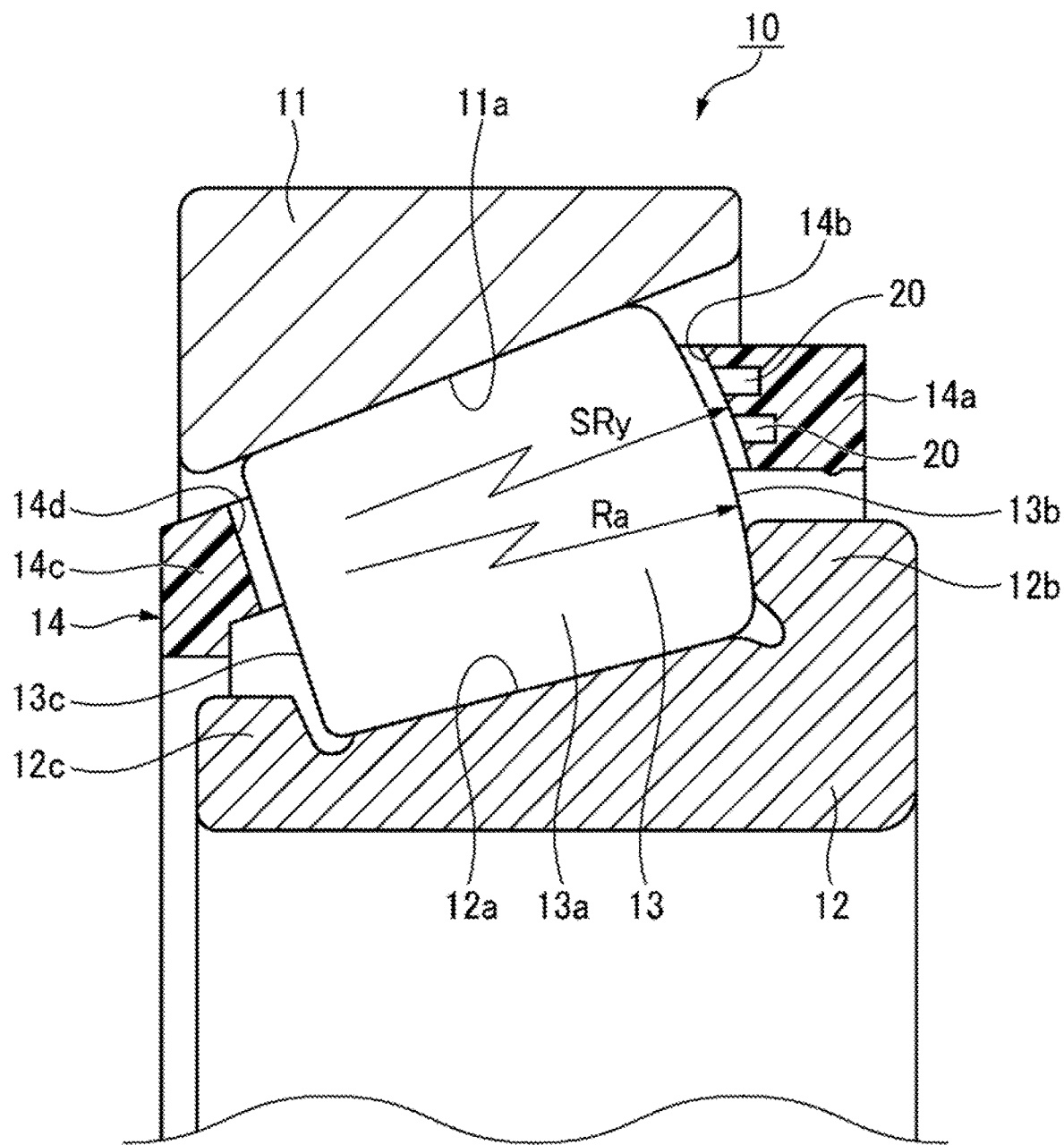
FIG. 16 is a cross-sectional view showing an example in which a pocket surface of the holder is formed in a concave spherical shape.
Figure 17:
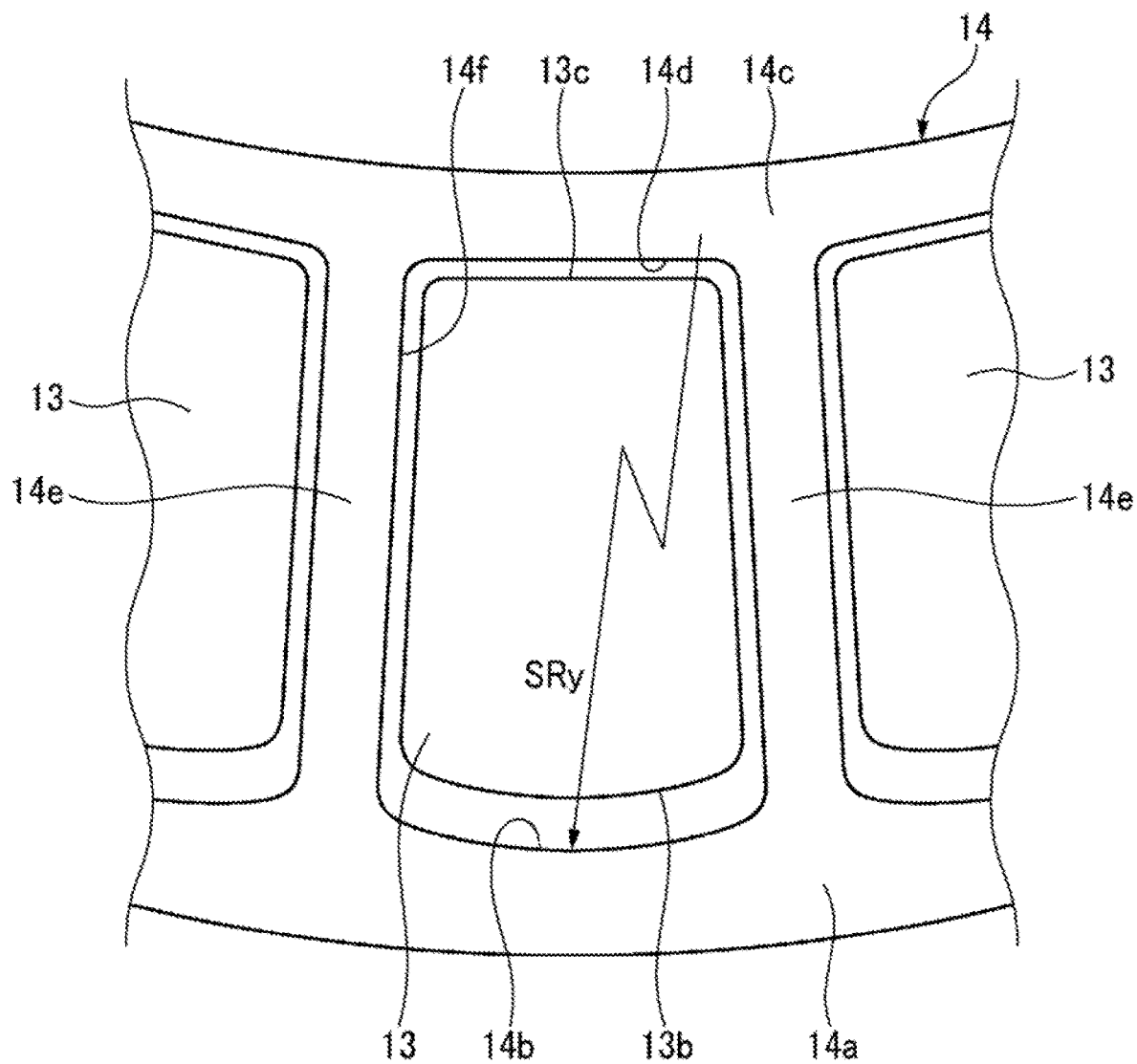
FIG. 17 is a plan view showing the holder and the tapered roller in the example of FIG. 16 when viewed from the outside in the radial direction.

FIGS. 16 and 17 are diagrams showing the surface shapes of the large-diameter-side end surface 13b of the tapered roller 13 and the pocket surface 14b. Meanwhile, the rollers of the tapered roller bearings have a structure in which the conical apexes of the outer diameters of all the rollers are converged at one point (cone center) on the bearing center axis. The large-diameter-side end surface 13b of the tapered roller 13 is formed in a convex spherical shape of which a radius Ra is a distance from the cone center.

Meanwhile, in the general holder of the related arts, the pocket surface has a flat shape or a conical shape, and the characteristic of close contact with the large-diameter-side end surface of the tapered roller is not taken into consideration, but in the present invention, in order to improve the oil supply effect of the lubricating oil by increasing the capillary force with the large-diameter-side end surface 13b of the tapered roller 13, it is desirable that the pocket surface 14b is formed in a concave spherical shape to minimize the gap between the large-diameter-side end surface 13b of the tapered roller 13 and the pocket surface 14b. When the radius of curvature of the concave spherical shape of the pocket surface 14b is SRy and the radius of curvature of the convex spherical shape of the large-diameter-side end surface 13b of the tapered roller 13 is Ra, it is more desirable to set SRy=Ra±20% Ra in order to exhibit a high lubrication effect. This is because, when the radius of curvature SRy of the concave spherical shape of the pocket surface 14b is too large or too small, the degree of close contact is decreased. However, when SRy and Ra are the same as each other (SRy Ra) and so the two areas are brought into full contact with each other, since the frictional resistance increases, it is optimal that the radii of curvature are slightly different from each other to prevent complete contact.

Figure 18:
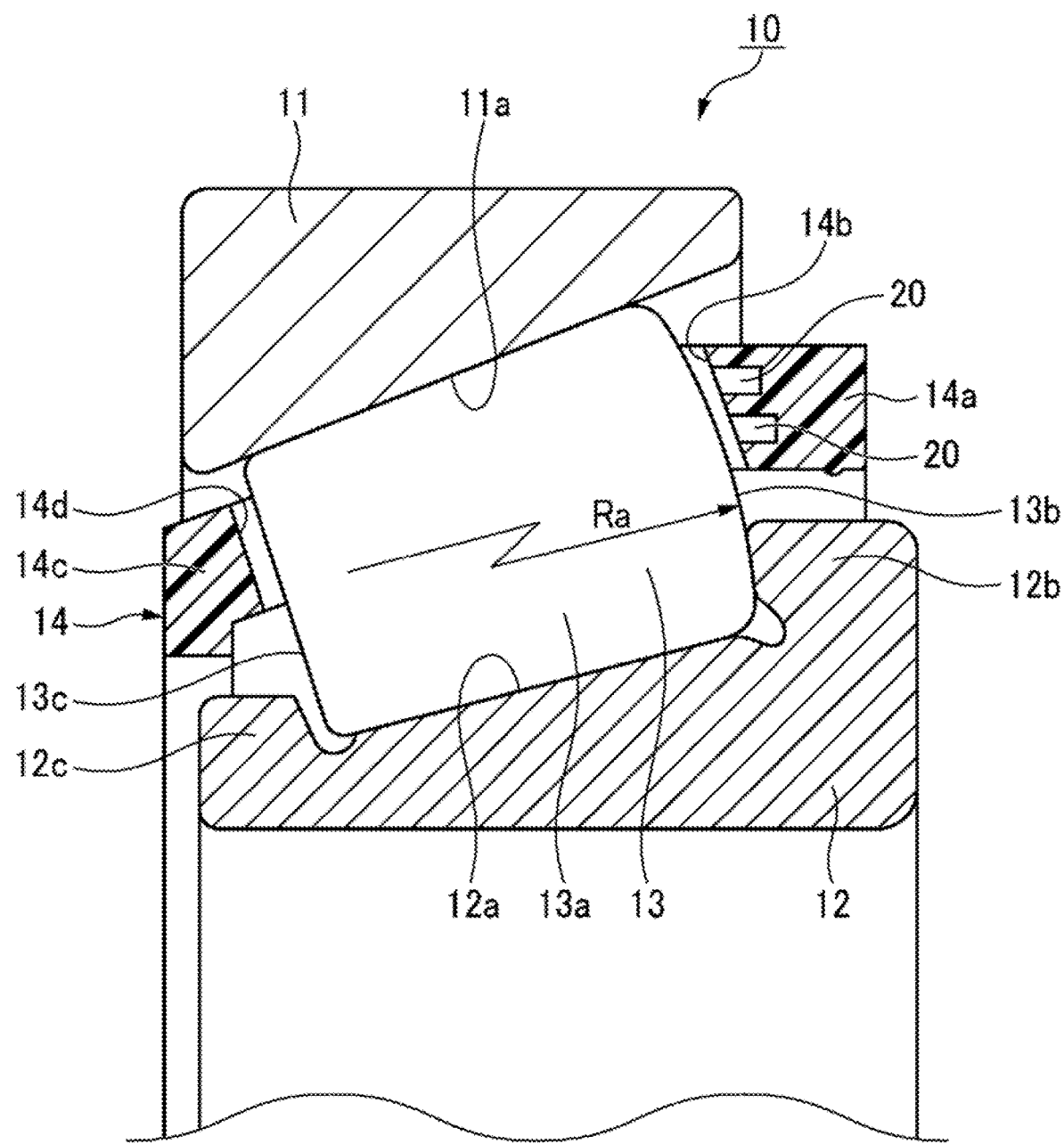
FIG. 18 is a cross-sectional view showing an example in which the pocket surface of the holder is formed in a concave shape along the circumferential direction.
Figure 19:
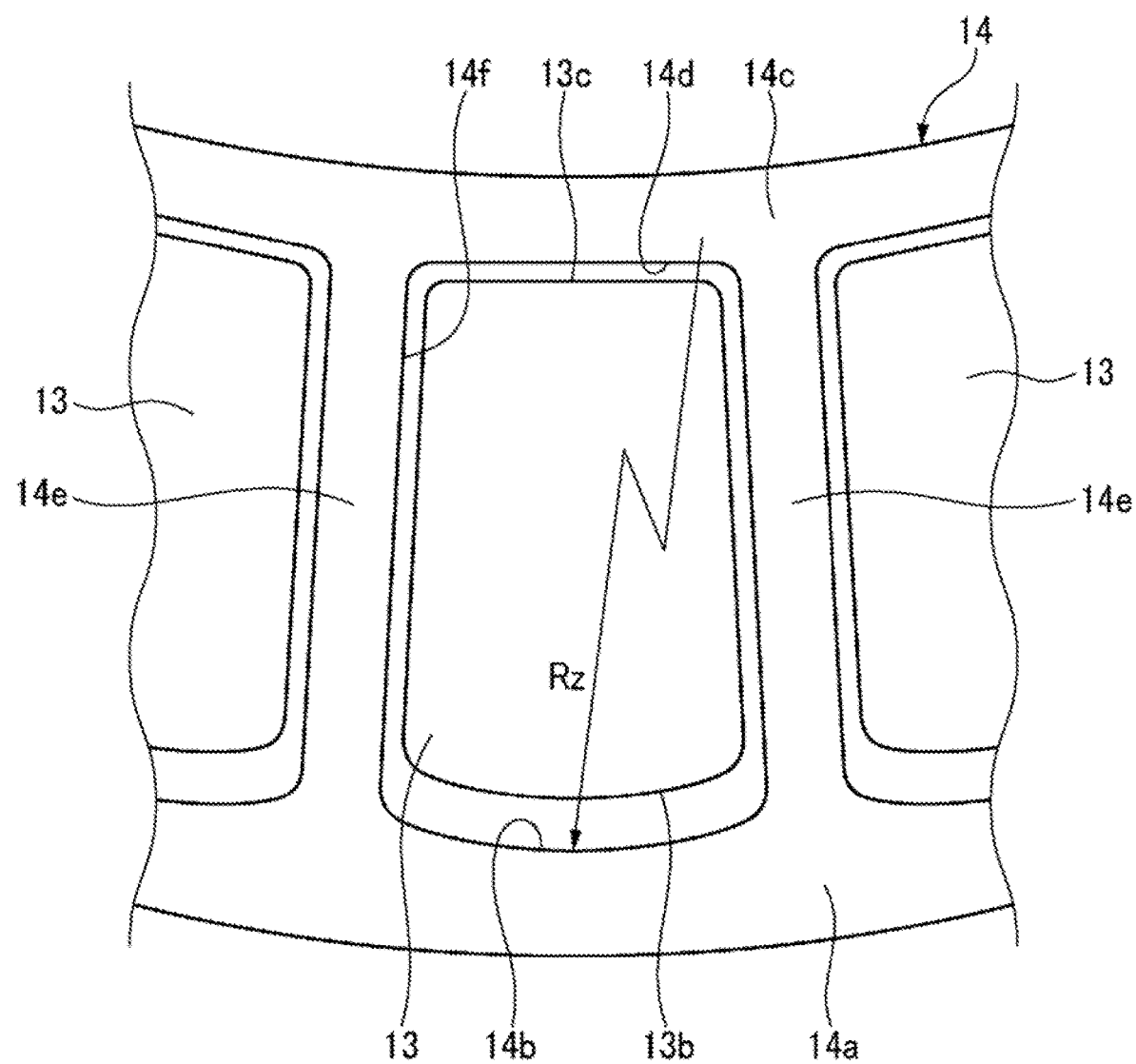
FIG. 19 is a plan view showing the holder and the tapered roller in the example of FIG. 18 when viewed from the outside in the radial direction.

FIGS. 18 and 19 are diagrams showing a first modification of the surface shape of the pocket surface 14b. In the present example, the pocket surface 14b is formed in a concave shape along the circumferential direction. Here, when the radius of curvature of the concave shape of the pocket surface 14b along the circumferential direction is Rz and the radius of curvature of the convex spherical shape of the large-diameter-side end surface 13b of the tapered roller 13 is Ra, it is desirable to set Rz=Ra±20% Ra.

Figure 20:
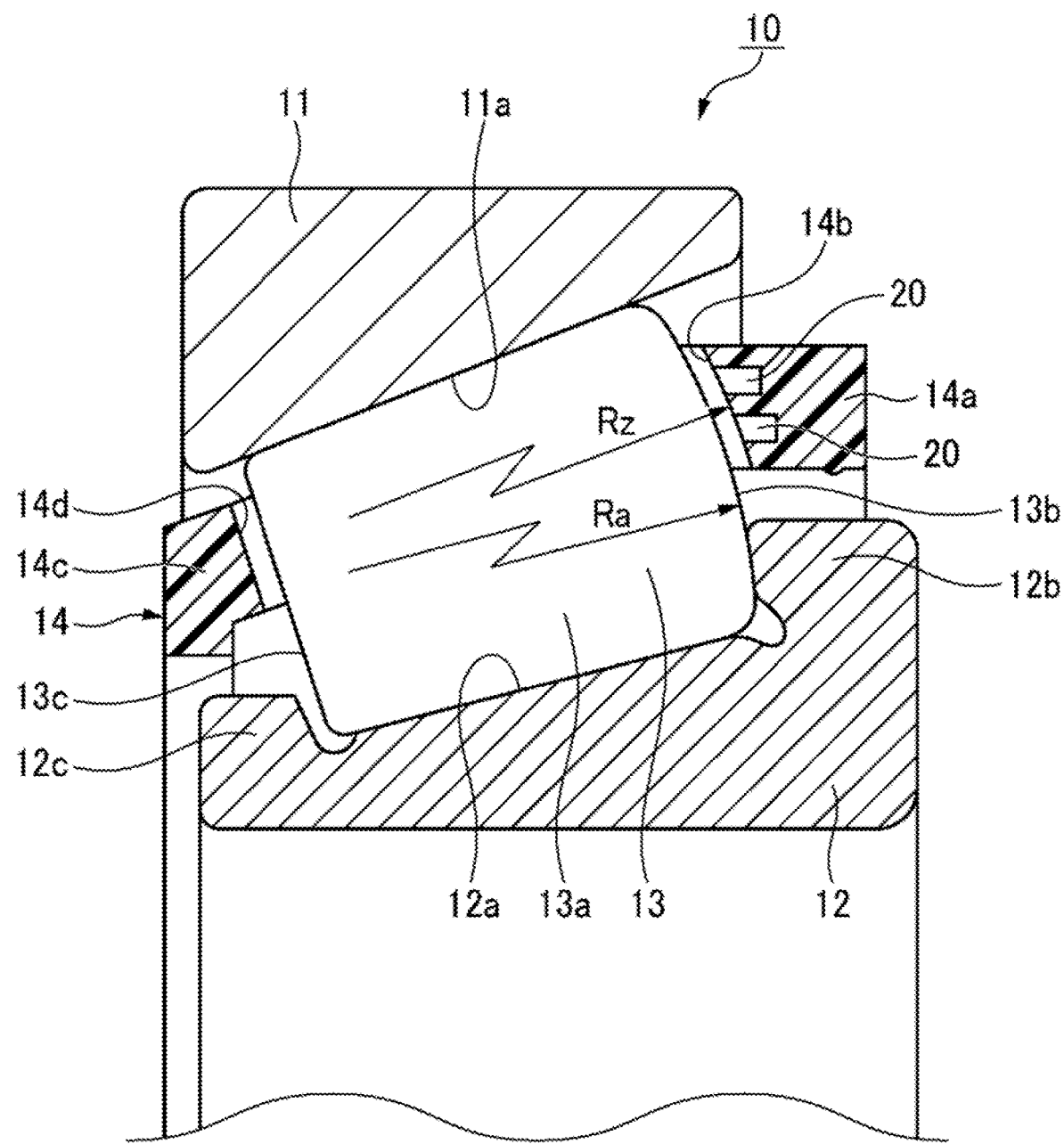
FIG. 20 is a cross-sectional view showing an example in which the pocket surface of the holder is formed in a concave shape along the radial direction.
Figure 21:
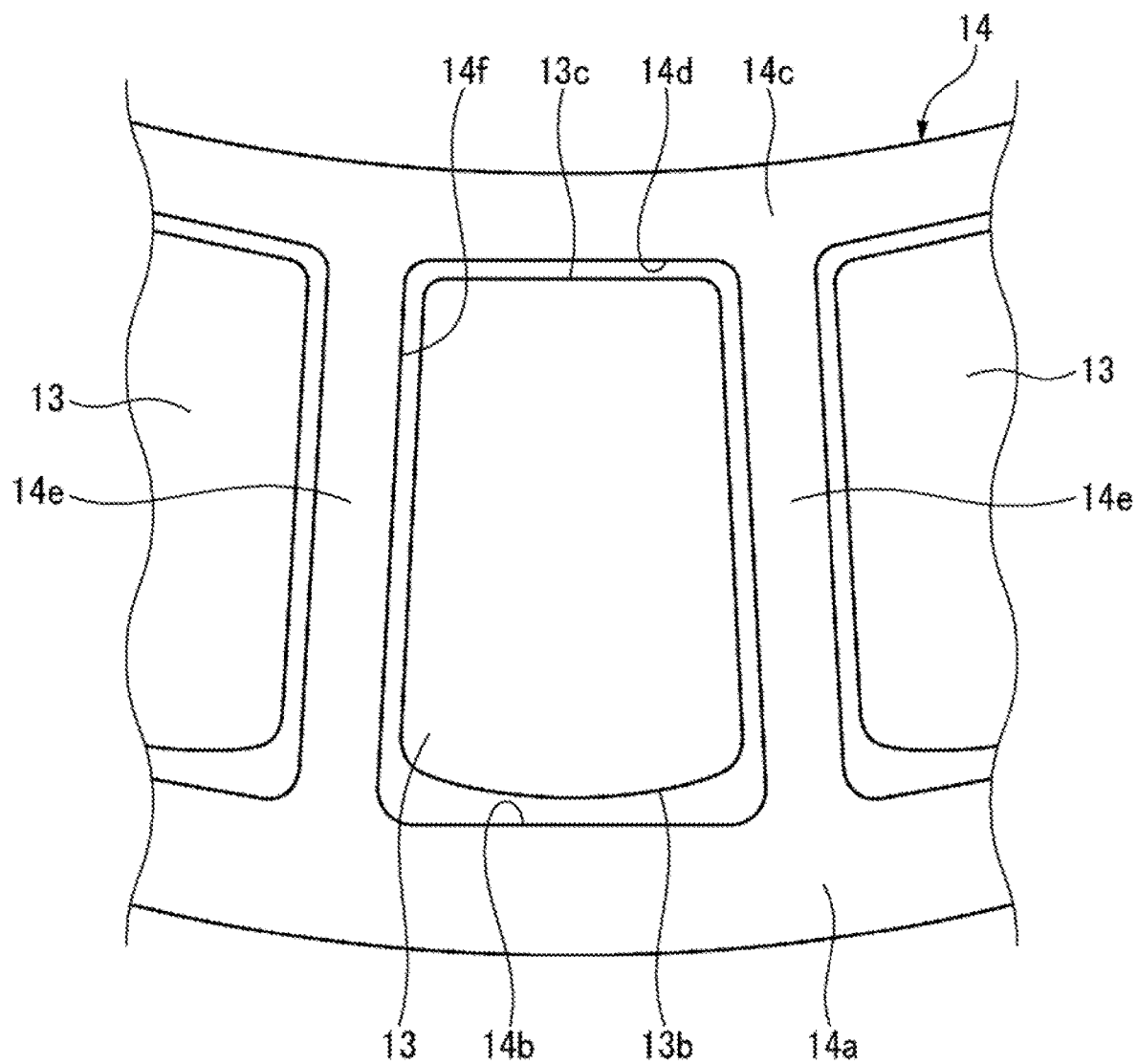
FIG. 21 is a plan view showing the holder and the tapered roller in the example of FIG. 20 when viewed from the outside in the radial direction.

FIGS. 20 and 21 are diagrams showing a second modification of the surface shape of the pocket surface 14b. In the present example, the pocket surface 14b is formed in a concave shape along the radial direction. Here, when the radius of curvature of the concave shape of the pocket surface 14b along the radial direction is Rz and the radius of curvature of the convex spherical shape of the large-diameter-side end surface 13b of the tapered roller 13 is Ra, it is desirable to set Rz=Ra±20% Ra.

The examples shown in FIGS. 18 to 21 are examples in which the pocket surface 14b is not formed in a concave spherical shape, but even here, the effect close to that of the spherical shape may be achieved. These examples are effective when spherical surface processing is extremely difficult or impossible due to reasons such as the manufacturing method of the mold.

Figure 3:
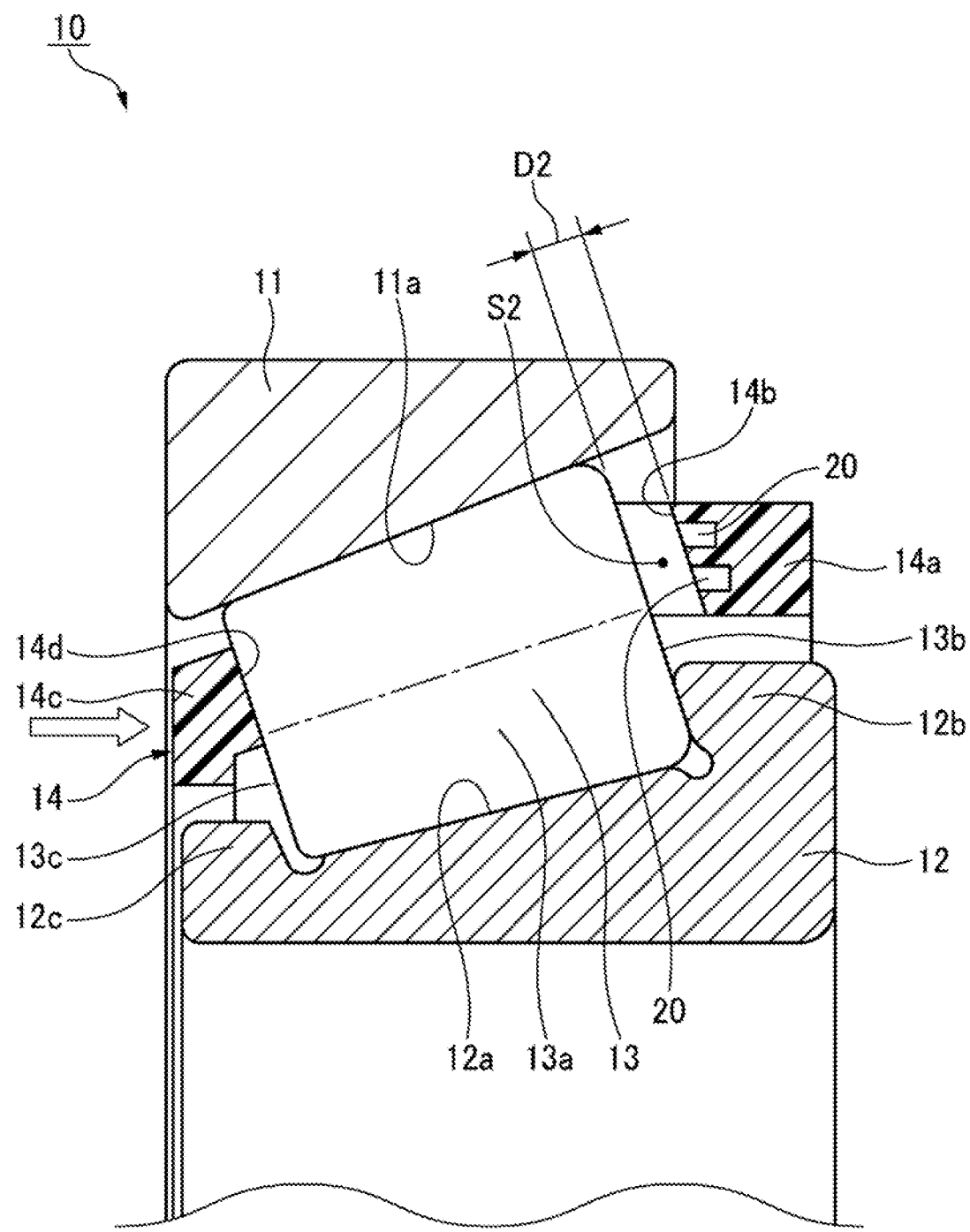
FIG. 3 is a cross-sectional view illustrating a state in which the holder shown in FIG. 1 is axially moved to a large-diameter-side of the tapered roller.

In the tapered roller bearing 10 configured as described above, when the lubricating oil is supplied to the bearing and the inside of the bearing is filled with the lubricating oil, due to the pumping action of the bearing rotation, there occurs phenomenon that the lubricating oil flows from the small-diameter-side to the large-diameter-side of the inner ring 12. Accordingly, in the present embodiment, as shown in FIG. 3, under the force of the lubricating oil flow due to the pump action, the holder 14 is axially moved toward the large-diameter-side of the tapered roller 13, and the large-diameter-side annular part 14a of the holder 14 is moved away from the tapered roller 13 (Dt=D2, D1=0). As a result, the large-diameter-side annular part 14a is not in constant contact with the tapered roller 13, thereby preventing an increase in frictional resistance during rotation of the bearing.

Figure 4:
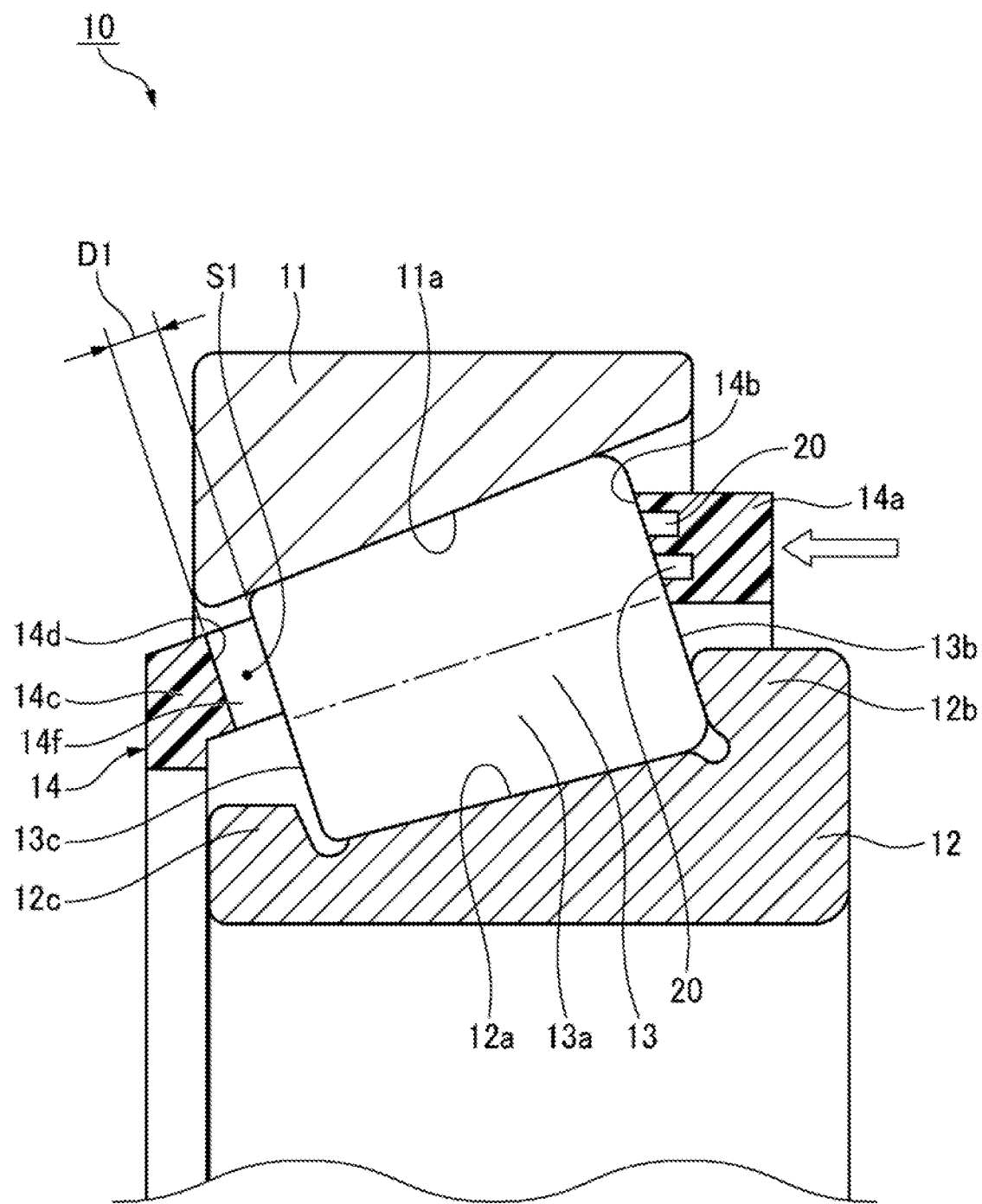
FIG. 4 is a cross-sectional view illustrating a state in which the holder shown in FIG. 1 is axially moved to a small-diameter-side of the tapered roller.

On the other hand, when the lubricating oil is not supplied to the bearing and the amount of the lubricating oil in the bearing is very small, the flow of the lubricating oil by the pump action does not occur, and as shown in FIG. 4, the holder 14 is moved axially toward the small-diameter-side of the tapered roller 13 by the component force of its self-weight, and the groove 20 formed on the axially inner end surface 14b of the large-diameter-side annular part 14a of the holder 14 comes into contact with the large-diameter-side end surface 13b of the tapered roller 13 (Dt=D1, D2=0). As a result, the lubricating oil stored in the groove 20 is supplied to the large-diameter-side end surface 13b of the tapered roller 13. That is, only when the amount of lubricating oil in the bearing is small, the groove 20 comes into contact with the large-diameter-side end surface 13b of the tapered roller 13, and the lubricating oil is supplied to the tapered roller 13. In the tapered roller bearing 10 of the present invention, since the holder 14 is moved by utilizing the component force of the self-weight of the holder 14, it is suitable for use in a structure for supporting a horizontally provided shaft (horizontal axis).

As described above, according to the tapered roller bearing 10 of the present embodiment, the surface of the axially inner end surface 14b of the large-diameter-side annular part 14a of the holder 14 is rough, and the grooves (oil retaining part) 20 for retaining lubricating oil by capillary force are provided on the axially inner end surface 14b of the large-diameter-side annular part 14a, such that, when the holder 14 is moved axially to the small-diameter-side of the tapered roller 13, the grooves 20 come into contact with the large-diameter-side end surface 13b of the tapered roller 13, and as a result, the seizure of the bearing 10 is prevented even under a lubricated environment with an extremely small amount of lubricating oil. When the holder 14 is axially moved to the large-diameter-side of the tapered roller 13, the grooves 20 are separated away from the large-diameter-side end surface 13b of the tapered roller 13, and the large-diameter-side annular part 14a having the grooves 20 formed therein is not in constant contact with the tapered rollers 13, and accordingly, an increase in frictional resistance during rotation of the bearing is prevented, and wear of the large-diameter-side annular part 14a having the grooves 20 formed therein is further prevented. It is not necessary to manage the dimensions of components with high precision, and the like, and an increase in manufacturing cost can be prevented.

To explaining this in more detail, the large-diameter-side annular part 14a having the grooves 20 formed therein does not have a contact force (pressing force) set in advance, and is brought into contact with the tapered roller 13 by the component force of the holder 14 itself, so that frictional resistance is hardly generated, thereby minimizing wear deterioration of the large-diameter-side annular part 14a.

According to the tapered roller bearing 10 of the present embodiment, the holder 14 may be made of synthetic resin, and the surface roughness of the axially inner end surface 14b of the large-diameter-side annular part 14a of the holder 14 and the grooves 20 may be injection-molded with the holder 14 at the same time by an axial drawing, so that an increase in manufacturing cost can be prevented.

According to the tapered roller bearing 10 of the present embodiment, the grooves 20 may be formed along the circumferential direction, and the direction in which the centrifugal force acts during rotation of the bearing and the direction in which the groove 20 are formed, may be orthogonal to each other, so that the lubricating oil retained in the grooves 20 can be prevented from scattering due to centrifugal force.

According to the tapered roller bearing 10 of the present embodiment, the amount of lubricating oil can be significantly reduced, thereby reducing the stirring resistance of the lubricating oil. For example, when the structure (see FIG. 23) is provided such that even a small amount of lubricating oil can be supplied by splashing by the gear, the lubricating oil pump and the oil supply passage can be eliminated, and thereby, it is possible to realize the low-weight and compactness of the overall system, and low cost.

According to the tapered roller bearing 10 of the present embodiment, even under a lubricated environment where the lubricating oil is intermittently supplied into the bearing or where there is an extremely small amount of lubricating oil in the bearing, the seizure can be prevented, and accordingly, it is possible to maintain the bearing performance and the lubricating effect for along period of time. Therefore, the tapered roller bearing 10 of the present embodiment can be suitably employed for a mechanism in which the lubricating oil pump is temporarily stopped during engine stop, such as in the transmission of some hybrid vehicles, and can deal with the situation where it is difficult to supply a sufficient amount of lubricating oil because the vehicle is towed and the lubricating oil pump does not operate.

Hereinafter, the lubricated environment with an extremely small amount of lubricating oil in the present specification will be described. For example, in the case of a transmission of a vehicle or the like, there are two generally known methods for supplying the lubricating oil: pumping the lubricating oil by the lubricating oil pump P shown in FIG. 31; and splashing the lubricating oil by the gear G shown in FIG. 32.

Figure 31:
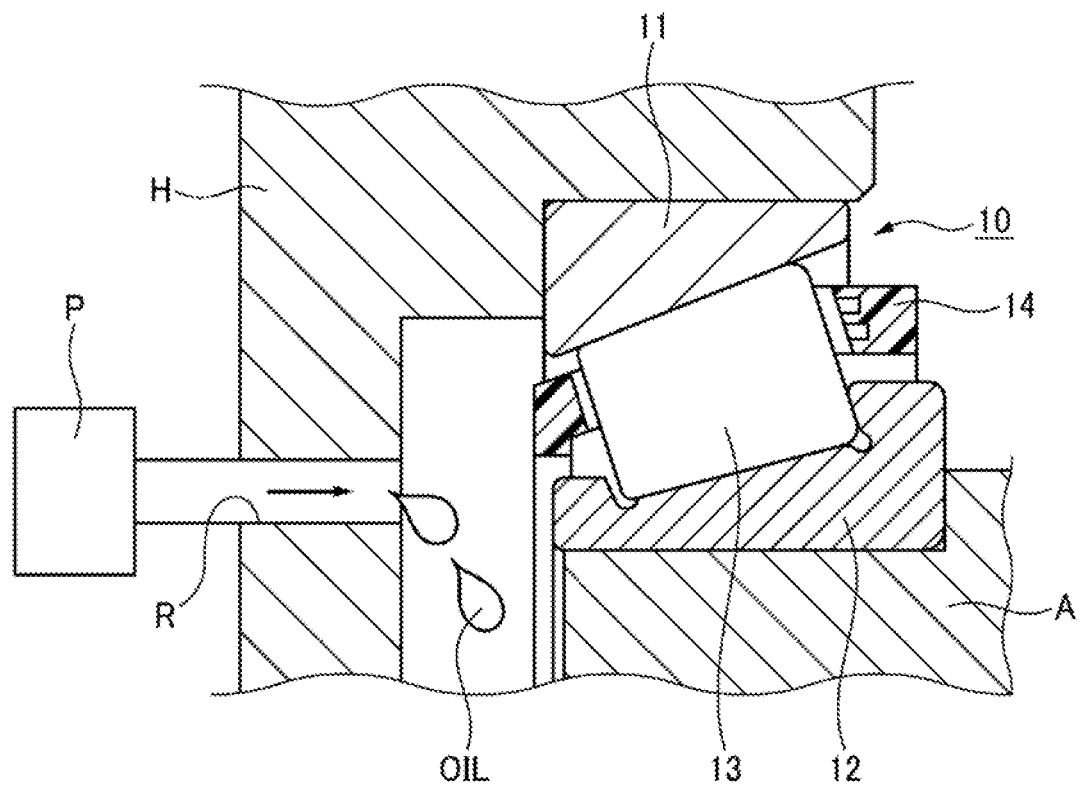
FIG. 31 is a cross-sectional view illustrating oil supply to a bearing by a lubricating oil pump.

As a structure for pumping the lubricating oil by the lubricating oil pump P, as shown in FIG. 31, the structure is generally known, in which the outer ring 11 of the tapered roller bearing 10 is internally fitted to the housing H, the inner ring 12 is externally fitted to the rotating shaft A, an oil supply passage R communicating with the bearing 10 is provided in the housing H, and a lubricating oil pump P is connected to the oil supply passage R. In the case of the pump structure, the lubricating oil pumped from the lubricating oil pump P is supplied to the bearing 10 through the oil supply passage R.

Figure 32:
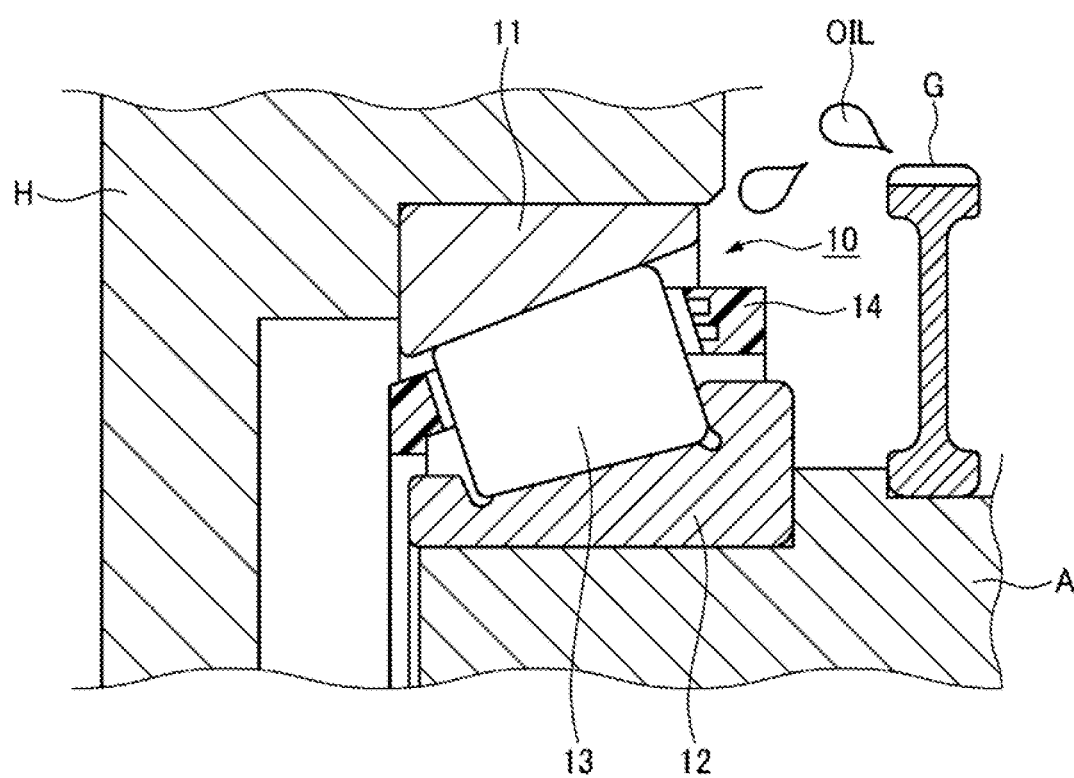
FIG. 32 is a cross-sectional view illustrating oil supply to the bearing by splashing of a gear.

As a structure in which the lubricating oil is splashed by the gear G, as shown in FIG. 32, a structure is generally known, in which the outer ring 11 of the tapered roller bearing 10 is internally fitted to the housing H, the inner ring 12 thereof is externally fitted to the rotating shaft A, and a gear G is provided on the rotating shaft A and adjacent to the inner ring 12. In the case of the gear structure, the lubricating oil attached to the gear G is scattered by the centrifugal force due to the shaft rotation, and the scattered lubricating oil is attached and supplied to the bearing 10.

In the two structures described above, lubricating oil is supplied in an amount of about 50 cc/min to 1000 cc/min in order to prevent the seizure of the bearing. When the amount of lubricating oil is less than 10 cc/min, heat generation and seizure are likely to occur due to insufficient oil film caused by the lack of lubricating oil, and when the amount of lubricating oil is 0 cc/min (zero lubricating oil), the seizure occurs. The present invention relates to dealing with a lean lubrication state rather than the non-lubricated state, which exhibits a great effect under a lubricated environment with an extremely small amount of lubricating oil, or specifically, in a lean lubrication state of about 0.01 cc/min to 10 cc/min.

Next, the environment in the present specification where the lubricating oil is intermittently supplied will be described. For example, in a hybrid vehicle, there is a mode in which the electric motor runs during engine stop. During the mode, with the structure having only the lubricating oil pump directly connected to the engine, driving is performed without lubricating oil being supplied to the bearing. Therefore, a non-lubricated state is continued for up to several minutes, but the bearing should be prevented from seizure during the time duration. It is demanded that the electric travel time duration is extended with the evolution of the battery. At present, in order to prevent seizure, some types of vehicles control to cause the engine to rotate at regular intervals to operate the lubricating oil pump. In order to solve this problem, it is necessary to add an electric lubricating oil pump to the system or to adopt a seizure-resistant bearing against non-lubrication as in the present invention. In the present invention, since the time duration until seizure is related to the oil retention amount retained in the oil retaining part, the non-lubrication application time duration can be significantly extended from several tens of minutes to several hours by increasing the oil retention amount. The oil retention amount may be increased by increasing the number of oil grooves or increasing the depth of the oil grooves, for example.

A passenger car may be towed at the time of a failure, or as an auxiliary vehicle attached to a large vehicle such as a camping car which is leading. In such a case, the idling may be prevented by placing the drive wheels of a vehicle on a bogie or the like, but in reality, there are cases in which the drive wheels are towed while idling. Here, since there is no drive transmission and there is no load idling, the load on the bearing is light, but in the case of the tapered roller bearing, since it is generally used with a preload, the load corresponding to the preload is always exerted. Then, in the idling state, since the engine and the electric lubricating oil pump do not operate and the lubricating oil pump is stopped, the bearing is likely to develop a seizure. As a countermeasure, some vehicle models include a drive device that is devised to cause splashing and refueling. According to the present invention, even if the lubricating oil pump is stopped, the bearing can be lubricated with oil until the lubricating oil stored in the oil retaining part is completely exhausted, which greatly improves the resistance against seizure even in a towed state where there is insufficient splashing or no splashing.

Figure 22:
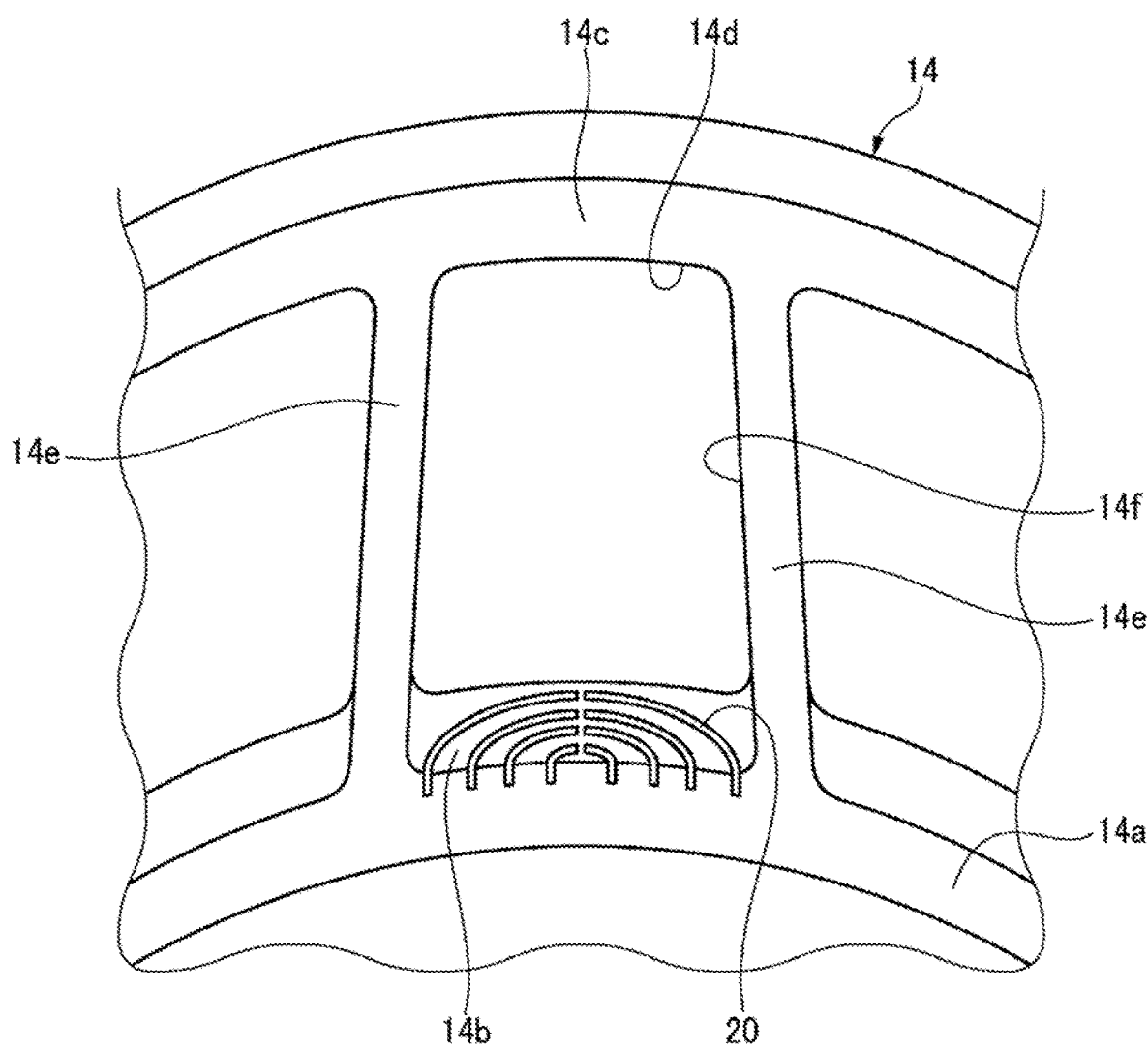
FIG. 22 is a schematic diagram illustrating a first modification of an oil retaining part according to a first embodiment.

Next, according to a first modification of the present embodiment, as shown in FIG. 22, the grooves 20 may be formed in a semicircular shape within the axially inner end surface 14b of the large-diameter-side annular part 14a (inside the pocket 14f). The grooves 20 are arranged concentrically with the central axis of the tapered roller 13. Accordingly, the tapered roller 13 enhances the harmonization of the oil film of the groove 20, and the lubricating oil is less likely to be splashed off by the centrifugal force caused by the rotation of the bearing so that the lubricating oil retained in the grooves 20 can be prevented from scattering due to the centrifugal force. Since the grooves 20 are open through the inner circumferential surface of the large-diameter-side annular part 14a and not open through the outer circumferential surface side of the large-diameter-side annular part 14a, the oil retaining property of the groove 20 can be improved. The grooves 20 formed in a semicircular shape include two grooves with a shape such that it is divided at the center thereof, and the ends of the grooves 20 are brought into contact with the large-diameter-side end surface 13b of the tapered roller 13.

Figure 23:
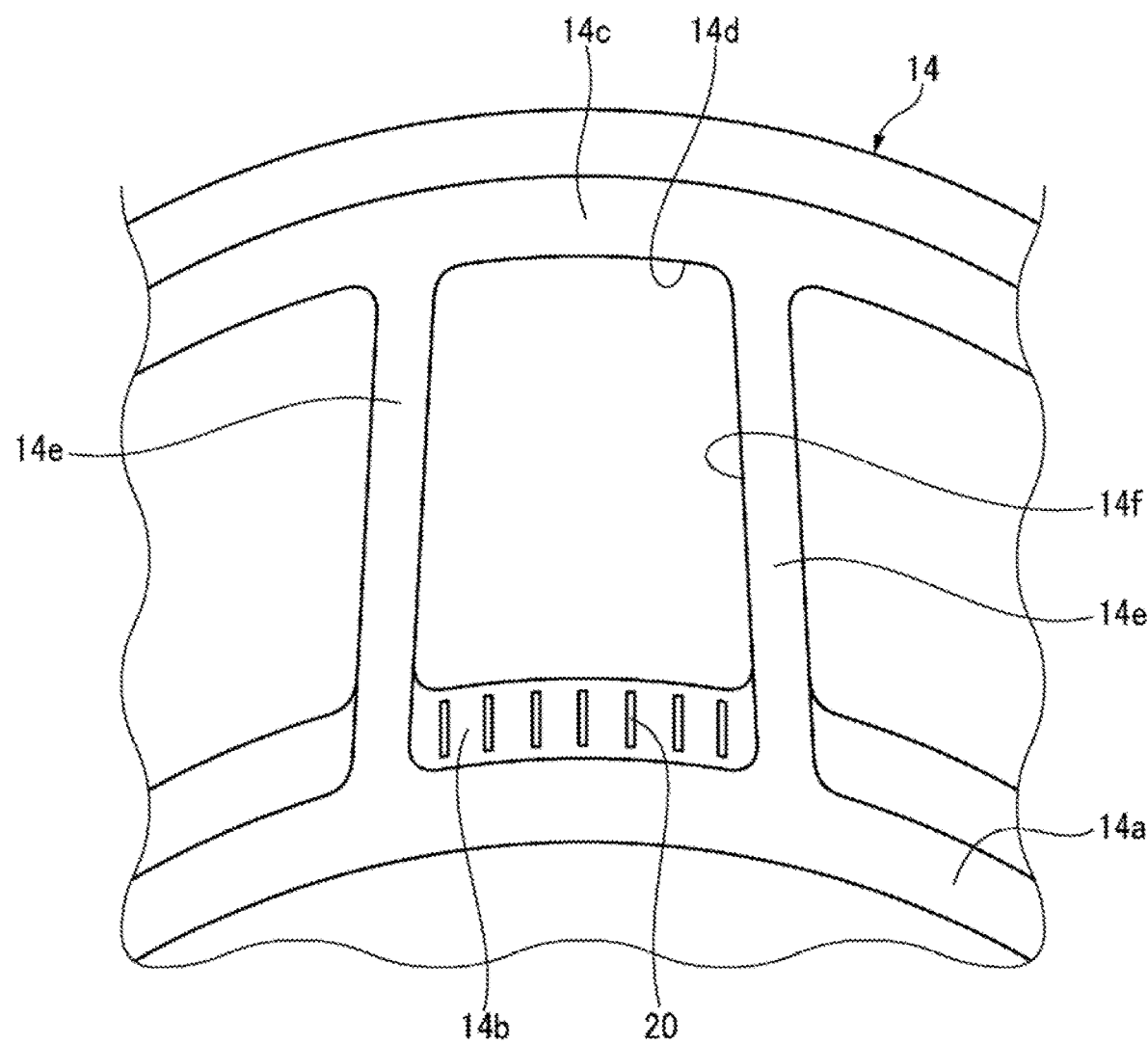
FIG. 23 is a schematic diagram illustrating a second modification of the oil retaining part according to the first embodiment.

According to a second modification of the present embodiment, as shown in FIG. 23, the grooves 20 may be formed linearly in the radial direction and parallel to the circumferential direction within the axially inner end surface 14b of the large-diameter-side annular part 14a (inside the pocket 14f). The grooves 20 are formed as a blind groove that does not penetrate into either the inner circumferential surface or the outer circumferential surface of the large-diameter-side annular part 14a. According to the present modification, since the grooves 20 are linearly formed in the radial direction, the lubricating oil is likely to be splashed off by the centrifugal force caused by the rotation of the bearing, and thus the lubrication can be efficiently performed at a low speed rotation. Since the grooves 20 are formed as a blind groove, the lubricating oil can be retained in the grooves 20 against a certain degree of centrifugal force.

Figure 24:
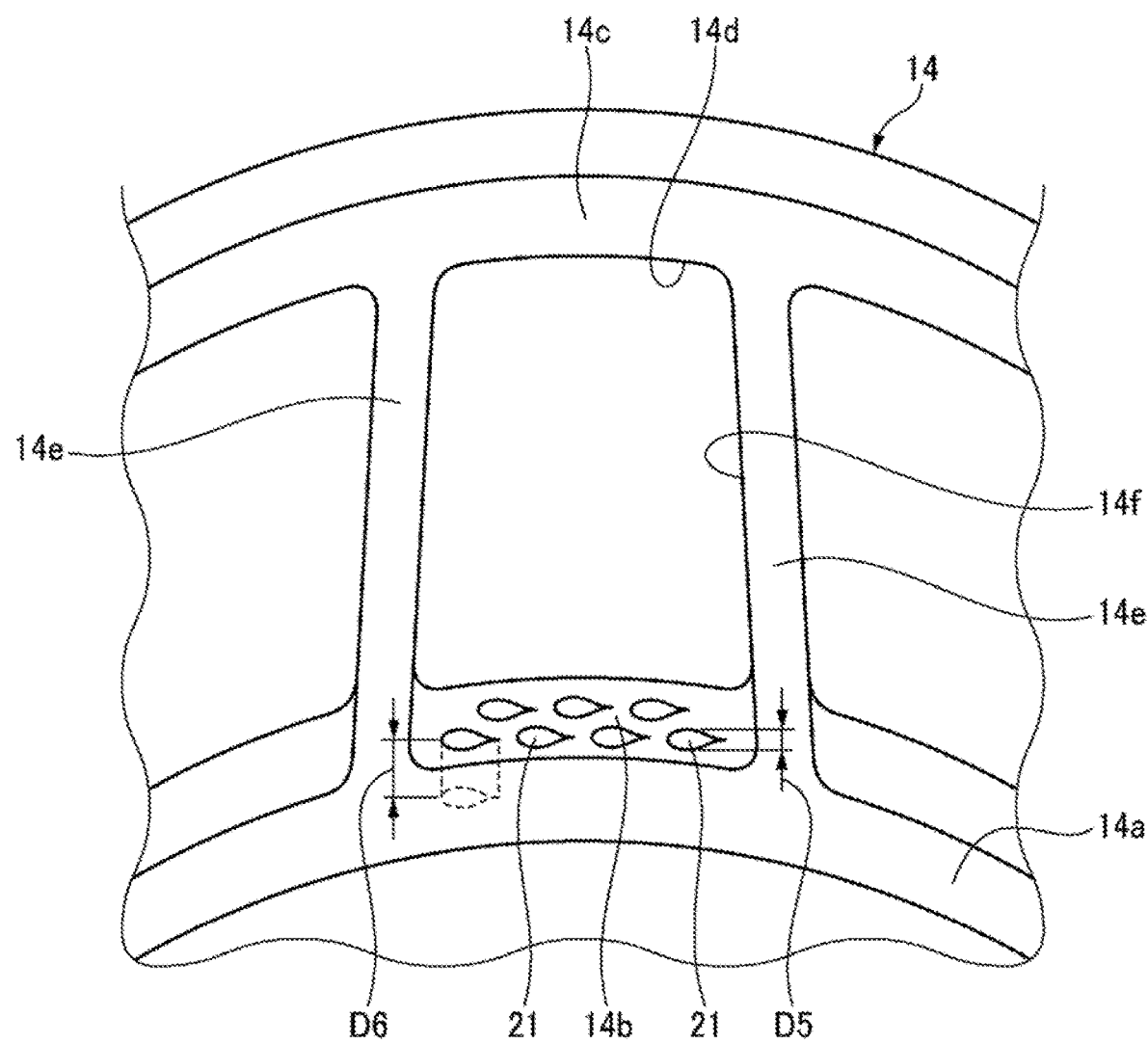
FIG. 24 is a schematic diagram illustrating a third modification of the oil retaining part according to the first embodiment.

According to a third modification of the present embodiment, as shown in FIG. 24, instead of the grooves 20, a plurality of holes 21 (seven, in the present modification) may be formed on the axially inner end surface 14b of the large-diameter-side annular part 14a (inside pocket 14f). The holes 21 are a bottomed hole with a teardrop shape when viewed in the axial direction, in which the width D5 (shorter diameter side) of the hole 21 is set in a range from 0.01 mm to 0.5 mm, and the depth D6 of the hole 21 is set in a range from 0.05 mm to ⅕ of the length dimension LR of the tapered roller 13 or less. According to the present modification, it is possible to retain the lubricating oil, while preventing the degradation in the strength of the holder 14. The hole 21 is not limited to the teardrop shape as long as there is a narrowed portion in a part of the opening, and may have a polygonal shape or the like such as a lemon shape or a triangular shape, or a combination thereof.

Second Embodiment

Next, a second embodiment of a tapered roller bearing according to the present invention will be described with reference to FIGS. 25 to 28. The same or equivalent parts as those in the first embodiment are given the same reference numerals in the drawings and their explanation is omitted or simplified.

Figure 25:
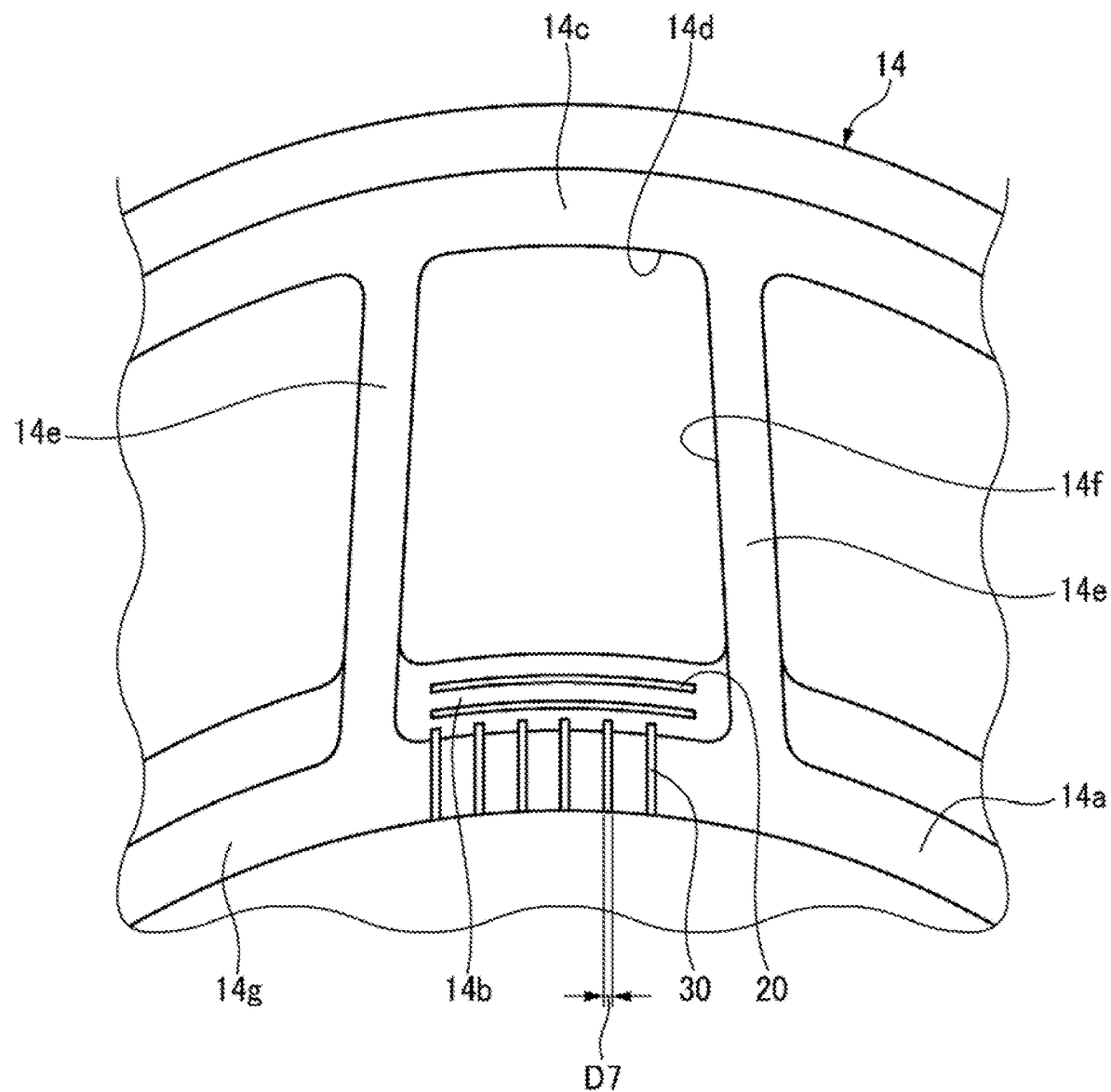
FIG. 25 is a schematic view showing the holder of the tapered roller bearing according to a second embodiment of the present invention when viewed from the inside in the radial direction.

In the present embodiment, as shown in FIG. 25, a plurality of the grooves 20 (two, in the present embodiment) described above are formed parallel to each other along the circumferential direction on the axially inner end surface 14b of the large-diameter-side annular part 14a of the holder 14 (pocket surface). The surface of the inner circumferential surface 14g of the large-diameter-side annular part 14a of the holder 14 is rough, and a plurality of annular part grooves 30 (six, in the present embodiment) (oil retaining part) are formed on the inner circumferential surface 14g of the large-diameter-side annular part 14a. The annular part grooves 30 are formed linearly in the axial direction and parallel to the circumferential direction. The annular part grooves 30 are formed to penetrate the large-diameter-side annular part 14a in the axial direction in consideration of the drawability at the time of mold releasing after molding. Note that the annular part grooves 30 may be provided for the entire pockets 14f, or may be provided for some of the pockets 14f.

The surface roughness of the inner circumferential surface 14g of the large-diameter-side annular part 14a is set to 3 μm to 20 μm, like the axially inner end surface 14b. The width D7 of the annular part groove 30 is set in a range from 0.01 mm to 0.5 mm, and the depth D8 of the annular part groove 30 (see FIG. 26) is set in a range from 0.05 mm to ⅕ of the outer diameter Dr of the large-diameter-side end of the tapered roller 13 or less (see FIG. 1).

As described above, according to the tapered roller bearing 10 of the present embodiment, the surface of the axially inner end surface 14b and the inner circumferential surface 14g of the large-diameter-side annular part 14a of the holder 14 are rough, the grooves 20 are formed on the axially inner end surface 14b of the large-diameter-side annular part 14a, and the annular part grooves 30 are formed on the inner circumferential surface 14g of the large-diameter-side annular part 14a, so that the oil retaining ability and oil supplying ability of the holder 14 can be enhanced, and thus seizure of the bearing 10 can be further prevented.

Figure 26:
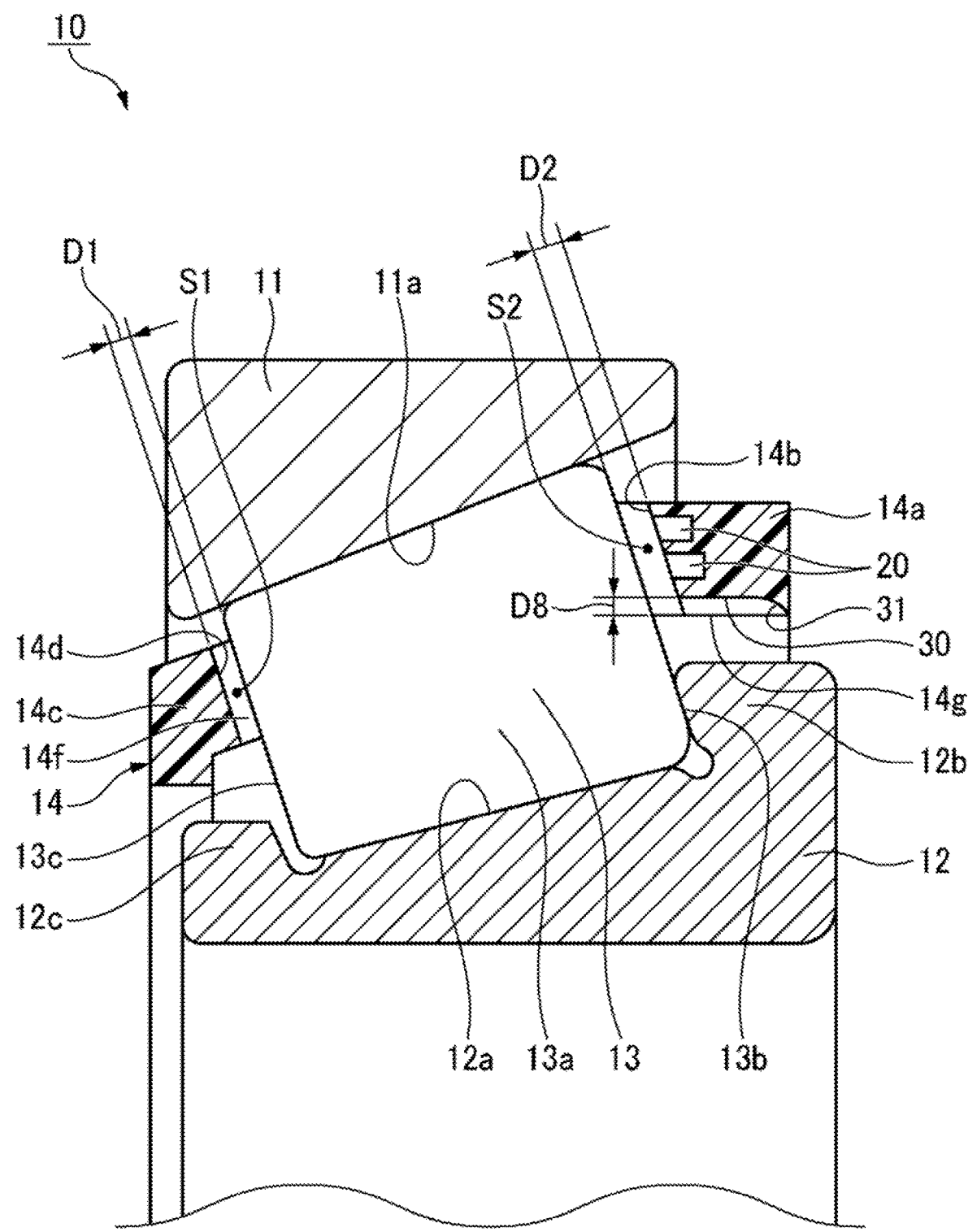
FIG. 26 is a cross-sectional view showing a first modification of the oil retaining part according to the second embodiment.

Next, according to a first modification of the present embodiment, as shown in FIG. 26, a weir part 31 that closes an axially outer end opening of the annular part groove 30 may be provided at the axially outer end of the annular part groove 30 according to the optimization of the injection molding die.

Figure 27:
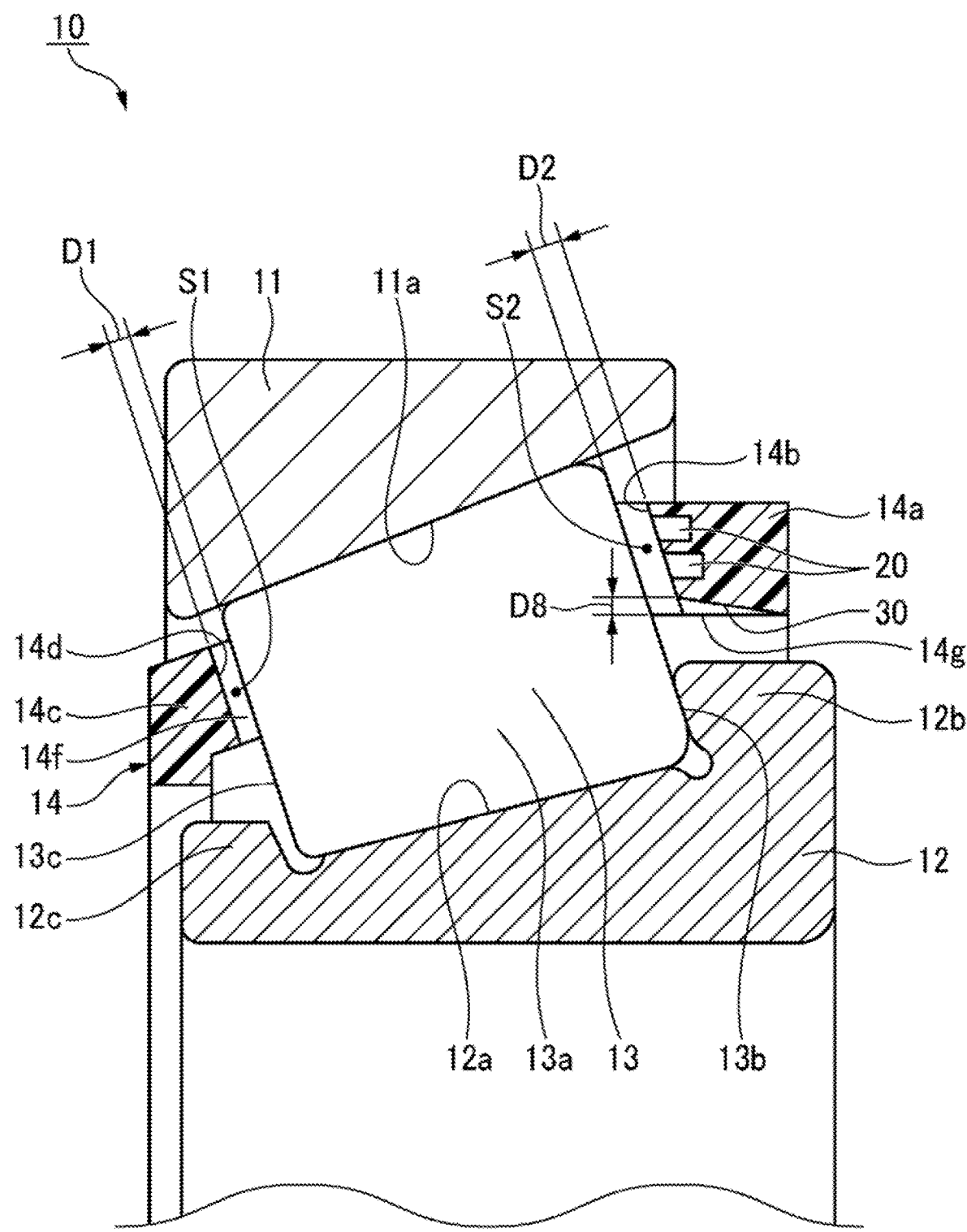
FIG. 27 is a cross-sectional view showing a second modification of the oil retaining part according to the second embodiment.

According to a second modification of the present embodiment, as shown in FIG. 27, the bottom surface of the annular part groove 30 may be inclined such that the depth D8 of the annular part groove 30 is gradually reduced toward the outer side in the axial direction according to the optimization of the injection molding die, and thus the depth becomes zero at the outer end in the axial direction. Note that not only the depth D8 of the annular part groove 30 may be changed, but also the width D7 of the annular part groove 30 may be gradually narrowed outward in the axial direction, or both of them may be changed.

Figure 28:
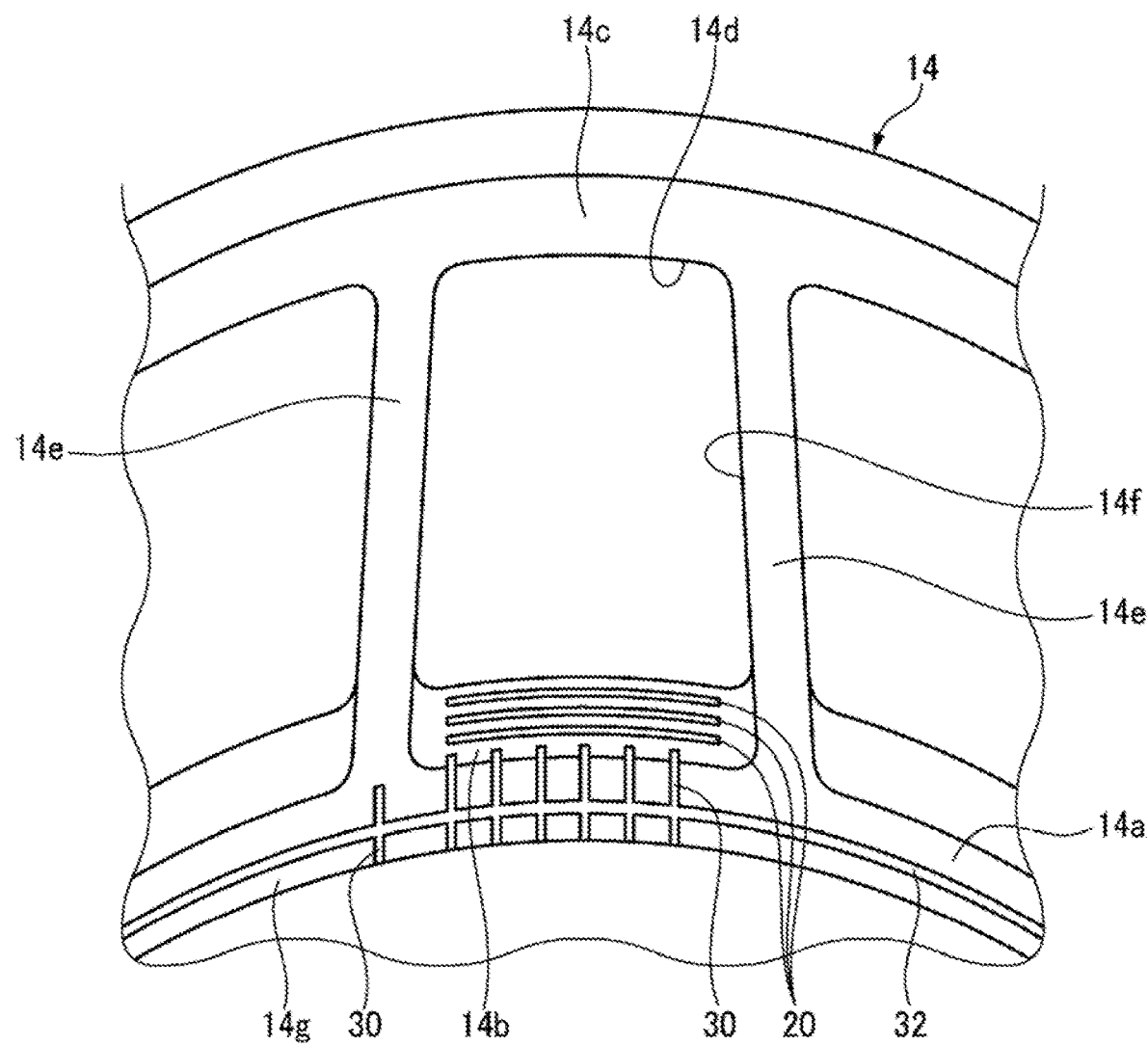
FIG. 28 is a schematic view showing a third modification of the oil retaining part according to the second embodiment.

According to a third modification of the present embodiment, as shown in FIG. 28, a plurality of grooves 20 (three, in the present embodiment) are provided on the axially inner end surface 14b of the large-diameter-side annular part 14a (pocket surface), and the circumferential groove 32 that is in communication with the annular part groove 30 in the circumferential direction may be formed over the entire circumference on the inner circumferential surface 14g of the large-diameter-side annular part 14a of the holder 14. Here, the annular part groove 30 may be additionally provided between the adjacent pockets 14f. According to the present modification, the lubricating oil widely retained by the large-diameter-side annular part 14a may be supplied to the pocket 14f side. In the case of the present modification, since the circumferential groove 32 is forcedly removed from the molding die, it is preferable that the depth of the circumferential groove 32 is in a range from 0.05 mm to 2 mm, and the width of the circumferential groove 32 is set in a range from 0.5 mm to −1 mm from the width of the large-diameter-side annular part 14a of holder 14.

Other configurations and operational effects are the same as those described in the first embodiment.

Third Embodiment

Next, a third embodiment of a tapered roller bearing according to the present invention will be described with reference to FIGS. 29 and 30. The same or equivalent parts as those in the first and second embodiments are given the same reference numerals in the drawings and their explanation is omitted or simplified.

Figure 29:
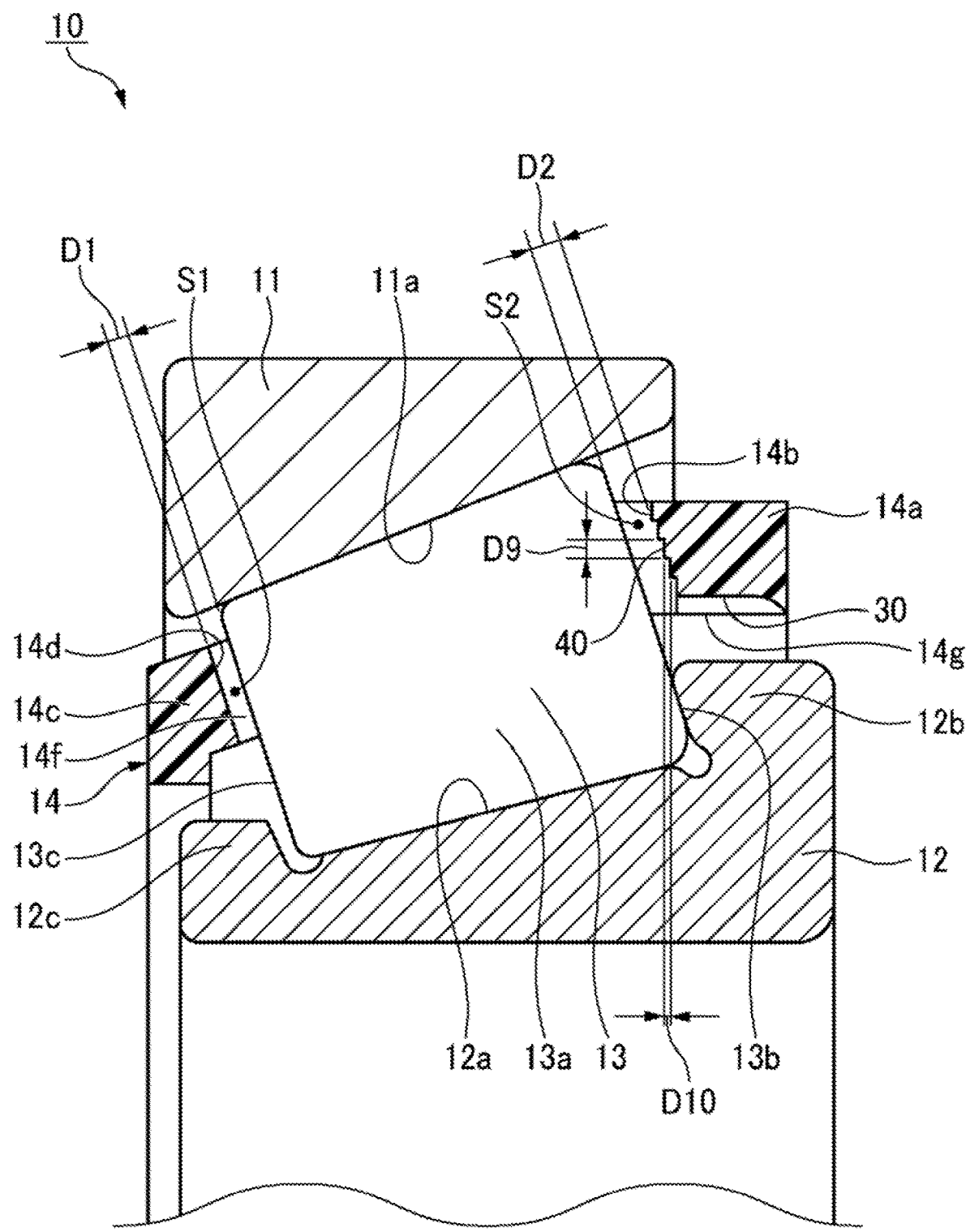
FIG. 29 is a cross-sectional view illustrating a third embodiment of the tapered roller bearing according to the present invention.
Figure 30:
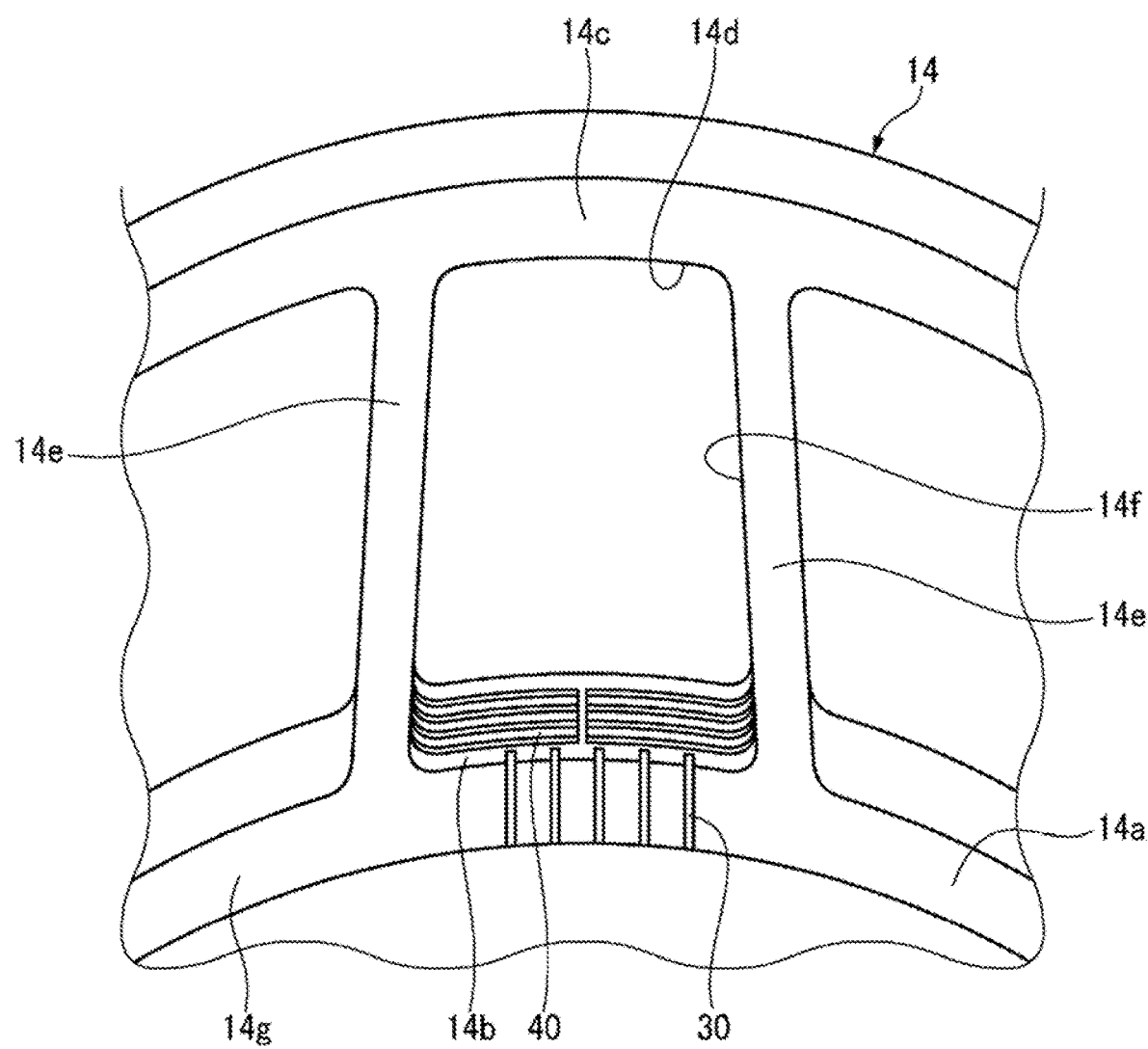
FIG. 30 is a schematic view showing the holder shown in FIG. 29 when viewed from the inside in the radial direction.

In the present embodiment, as shown in FIGS. 29 and 30, instead of the grooves 20, a stepped part 40 including a plurality of steps is formed in the axially inner end surface 14b of the large-diameter-side annular part 14a of the holder 14 (in the pocket 14f). The stepped part 40 is an oil retaining part capable of retaining the lubricating oil by the capillary force. The stepped part 40 is formed in a shape such that it is divided at the center thereof. In the present embodiment, annular part grooves 30 like those of the first modification (see FIG. 26) of the second embodiment are formed on the inner circumferential surface 14g of the large-diameter-side annular part 14a of the holder 14. The stepped part 40 and the annular part grooves 30 may be provided for the entire pockets 14f, or may be provided for some of the pockets 14f.

The plurality of steps of the stepped part 40 are formed parallel to each other in the circumferential direction on the axially inner end surface 14b of the large-diameter-side annular part 14a. As in the case of the grooves, the steps are provided with a step end at a position in contact with the tapered roller 13, and the radius of curvature of a step corner of the step end is formed smaller than that of the step center, so that the capillary force can be increased. The width D9 (radial dimension) of one step is set in a range from 0.01 mm to 0.5 mm, and the height D10 (axial dimension) of one step is set in a range from 0.01 mm to 0.5 mm. The surface of the stepped part 40 is rough, and the surface roughness is 3 μm to 20 μm. The inner circumferential surface 14g of the large-diameter-side annular part 14a is also rough, and the surface roughness is 3 μm to 20 μm.

As described above, according to the tapered roller bearing 10 of the present embodiment, the stepped part 40 is formed on the axially inner end surface 14b of the large-diameter-side annular part 14a of the holder 14, the surface of the stepped part 40 is rough, the surface of the inner circumferential surface 14g of the large-diameter-side annular part 14a is rough, a plurality of annular part grooves 30 are formed on the inner circumferential surface 14g thereof, and the step end with increased capillary force is brought into contact with the tapered roller 13, so that the oil retaining ability and oil supplying ability of the holder 14 can be enhanced, and thus seizure of the bearing 10 can be further prevented.

According to the tapered roller bearing 10 of the present embodiment, the stepped part 40 is formed along the circumferential direction, and the direction in which the centrifugal force acts during rotation of the bearing and the direction in which the stepped part 40 is formed, may be orthogonal to each other, so that scattering of the lubricating oil retained in the stepped part 40 due to centrifugal force can be prevented. Since the strength conditions for the holder 14 with respect to the injection molding die are relaxed, an increase in manufacturing cost can be further prevented.

Other configurations and operational effects are the same as those described in the first and second embodiments.

It should be noted that the present disclosure is not limited to those exemplified in the embodiments described above, and can be appropriately modified without departing from the gist of the present invention.

EXAMPLES

In order to confirm the function and effect of the present invention, a tapered roller bearing including an oil retaining part (groove)(example of the present invention, a product corresponding to the first embodiment) and a tapered roller bearing including no oil retaining part (comparative example, product of the related arts) were prepared and seizure tests were performed on each. The test conditions are as follows.

The test conditions were as follows: a single row tapered roller bearing ($\phi 25 \times \phi 55 \times 17$) with a cage type press holder was attached to the horizontal axis (horizontal axis), the test load was an axial load of 4 kN, the rotation speed was 5,000 rpm, the working oil (VG32) was used as the lubricating oil, 5 ml of the lubricating oil was supplied before the test was started, and no further oil was supplied during the test. The holder is formed by three-dimensional modeling (3D printing), has a surface roughness of 2 μm of the axially inner end surface of the large-diameter-side annular part (pocket surface), and includes an oil retaining part including four rows of grooves arranged in the circumferential direction (four rows of the two rows of grooves shown in FIG. 2, groove width: 0.2 mm, groove depth: 0.5 mm).

As a result of the test, in the comparative example, the test was carried out two times, and seizure occurred at 86 seconds in the first test, and 71 seconds in the second test. On the other hand, in the example of the present invention, seizure did not occur until 1271 seconds in the first test, and 997 seconds for the second test, and the seizure occurrence time could be extended. Accordingly, the effectiveness of the oil retaining part (groove) of the present invention was verified.

This application is based upon Japanese Patent Application (Application No. 2018-043540), filed on Mar. 9, 2018, the entire contents of which are incorporated herein by reference.

REFERENCE SIGNS LIST

10: tapered roller bearing
11: outer ring
11a: outer ring raceway surface
12: inner ring
12a: inner ring raceway surface
12b: large flange part
12c: small flange part
13: tapered roller
13a: rolling surface
13b: large-diameter-side end surface
13c: small-diameter-side end surface
14: holder
14a: large-diameter-side annular part
14b: axially inner end surface (pocket surface)
14c: small-diameter-side annular part
14d: axially inner end surface
14e: column part
14f: pocket
14g: inner circumferential surface
14h: circumferential side surface
20: plurality of grooves (oil retaining part)
20a: groove end 20b: groove center
20c: wall surface
20d: corner
20e: groove bottom corner in radial cross-section of groove
20f: groove bottom corner of circumferential cross-section of groove
21: a plurality of holes (oil retaining part)
30: annular part groove (oil retaining part)
40: stepped part (oil retaining part)
S1: first gap
S2: second gap
D1: axial dimension of the first gap
D2: axial dimension of the second gap
D3: radial width of groove
D4: groove depth
Dt: total dimension of the entire gap
LR: length dimension of tapered roller
LP: length dimension of pocket
Rw: radius of arc shape of groove bottom corner
Ra: radius of curvature of large-diameter-side end surface of tapered roller
SRy: radius of curvature of concave spherical shape of pocket surface
Rz: radius of curvature of concave shape of pocket surface
θ: opening angle

The invention claimed is:

1. A tapered roller bearing, comprising:
an outer ring including an outer ring raceway surface on an inner circumferential surface, an inner ring including an inner ring raceway surface on an outer circumferential surface, a plurality of tapered rollers rotatably provided between the outer ring raceway surface and the inner ring raceway surface, and a holder for holding the plurality of tapered rollers at substantially equal intervals in a circumferential direction, wherein
the holder includes a large-diameter-side annular part, a small-diameter-side annular part coaxially arranged with the large-diameter-side annular part, a plurality of column parts provided at substantially equal intervals in a circumferential direction and axially connecting the large-diameter-side annular part and the small-diameter-side annular part, and a pocket formed between the column parts adjacent to each other in the circumferential direction to hold the tapered roller to be capable of rolling,
the holder is made of resin, includes a first gap between the axially inner end surface of the small-diameter-side annular part and the small-diameter-side end surface of the tapered roller, includes a second gap between the axially inner end surface of the large-diameter-side annular part and the large-diameter-side end surface of the tapered roller, and is movable within a predetermined range along the axial direction,
among surfaces of the large-diameter-side annular part, at least the axially inner end surface is rough,
the large-diameter-side annular part is provided with an oil retaining part retaining a lubricating oil, and
when the holder is axially moved toward the small-diameter-side of the tapered roller, the oil retaining part comes into contact with the large-diameter-side end surface of the tapered roller, and when the holder is axially moved toward the large-diameter-side of the tapered roller, the oil retaining part is separated away from the large-diameter-side end surface of the tapered roller
the oil retaining part includes any one of one groove, a plurality of grooves, and a plurality of holes that has a fine shape configured to retain the lubricating oil by action of capillary force, and
the oil retaining part supplies the lubricating oil stored therein to the large-diameter-side end surface of the tapered roller by the action of the capillary force with the large-diameter-side end surface.

2. The tapered roller bearing according to claim 1, wherein
an end of the groove or an end of the hole, which is contactable with the tapered roller, is arranged on the axially inner end surface of the large-diameter-side annular part, in a projection plane of the large-diameter-side end surface of the tapered roller on the axially inner end surface of the large-diameter-side annular part, and
the groove or the hole supplies lubricating oil to the tapered roller from the end of the groove or the end of the hole that is connected with the axially inner end surface of the large-diameter-side annular part.

3. The tapered roller bearing according to claim 2, wherein a corner between the groove capable of retaining the lubricating oil and the axially inner end surface of the large- diameter-side annular part has a sharp edge.

4. The tapered roller bearing according to claim 2, wherein a groove bottom corner in a radial cross-section of the groove capable of retaining the lubricating oil is in an arc shape, and
the arc shape of the groove bottom corner includes a maximum arc portion of radius set to ¼ to ½ of a radial width of the groove.

5. The tapered roller bearing according to claim 4, wherein a radius of the arc shape of the groove bottom corner in the radial cross-section of the groove is decreased from a center toward the end of the groove.

6. The tapered roller bearing according to claim 2, wherein a depth of the end of the groove is smaller than a depth of a center of the groove.

7. The tapered roller bearing according to claim 2, wherein a width of the groove end of the groove is smaller than a width of a center of the groove.

8. The tapered roller bearing according to claim 2, wherein the axially inner end surface of the large-diameter-side annular part is in a shape such that more than half of the ends of the grooves provided on the axially inner end surface of the large-diameter-side annular part are contactable with the large-diameter side end surface of the tapered roller at the same time, in the projection plane of the large-diameter-side end surface of the tapered roller on the axially inner end surface of the large-diameter-side annular part.

9. The tapered roller bearing according to claim 1, wherein the holder has at least one of a structure in which an inner circumferential surface of the large-diameter-side annular part is radially guided by an outer circumferential surface of a large flange part of the inner ring, and a structure in which an inner circumferential surface of the small-diameter-side annular part is radially guided by an outer circumferential surface of a small flange part of the inner ring.

10. The tapered roller bearing according to claim 1, wherein an opening angle of a circumferential side surface of the column part configuring the pocket is set to 0 to 40 degrees.

11. The tapered roller bearing according to claim 1, wherein the axially inner end surface of the large-diameterside annular part is in a concave spherical shape, and the large- diameter-side end surface of the tapered roller is in a convex spherical shape, and when a radius of curvature of the concave spherical shape of the axially inner end surface of the large-diameter-side annular part is SRy and a radius of curvature of the convex spherical shape of the large-diameter-side end surface of the tapered roller is Ra, SRy=Ra±20% Ra is set.

12. The tapered roller bearing according to claim 1, wherein the axially inner end surface of the large-diameter-side annular part is in a concave shape along a circumferential direction or a radial direction, and the large-diameter-side end surface of the tapered roller is in a convex spherical shape, and when a radius of curvature of concave shape of the axially inner end surface of the large-diameter-side annular part along a circumferential direction or a radial direction is Rz, and a radius of curvature of convex spherical shape of the large-diameter-side end surface of the tapered roller is Ra, Rz=Ra±20% Ra is set.

13. The tapered roller bearing according to claim 1, wherein the oil retaining part includes a stepped part capable of retaining lubricating oil.

14. The tapered roller bearing according to claim 1, wherein the bearing is used under a lubricated environment where lubricating oil is intermittently supplied to inside of the bearing, or where there is an extremely small amount of lubricating oil in the bearing.

15. The tapered roller bearing according to claim 1, wherein the axially inner end surface has a surface roughness of 3 μm to 20 μm in arithmetic mean roughness.

16. The tapered roller bearing according to claim 1, wherein the axially inner end surface is rougher than a circumferential side surface of the column part.

* * * * *